(12) United States Patent
Cashiola

(10) Patent No.: US 6,535,593 B1
(45) Date of Patent: Mar. 18, 2003

(54) SYSTEM AND METHOD FOR BILLING COMMUNICATIONS SERVICES PROVISIONED ON DEMAND IN CONVERGING TELECOMMUNICATIONS NETWORK

(75) Inventor: James P. Cashiola, Austin, TX (US)

(73) Assignee: Simplified Development Corp., Austin, TX (US)

( * ) Notice: Subject to any disclaimer, the term of this patent is extended or adjusted under 35 U.S.C. 154(b) by 0 days.

(21) Appl. No.: 09/514,207

(22) Filed: Feb. 28, 2000

(51) Int. Cl.[7] ............................................. H04M 15/00
(52) U.S. Cl. ........................... 379/121.01; 379/114.01; 379/114.05; 379/130; 379/121.04; 379/122; 379/114.16; 379/114.17; 379/114.2; 379/201.12
(58) Field of Search ................................. 379/120, 121, 379/114, 115, 112, 130, 116, 119, 114.05, 114.01, 115.01, 115.02, 121.01, 121.04, 121.06, 122, 126, 127.01, 127.06, 201.01, 201.12, 201.02; 455/405, 406; 705/40

(56) References Cited

U.S. PATENT DOCUMENTS

| | | | | |
|---|---|---|---|---|
| 5,506,893 A | * | 4/1996 | Buscher et al. | 379/114 |
| 5,771,282 A | * | 6/1998 | Friedes | 379/121 |
| 6,032,132 A | * | 2/2000 | Nelson | 379/112 |
| 6,088,432 A | * | 7/2000 | Le | 379/114 |
| 6,115,737 A | * | 9/2000 | Ely et al. | 709/203 |
| 6,141,404 A | * | 10/2000 | Westerlage et al. | 379/114 |
| 6,181,785 B1 | * | 1/2001 | Adams et al. | 379/114 |
| 6,266,401 B1 | * | 7/2001 | Marchbanks et al. | 379/116 |
| 6,317,490 B1 | * | 11/2001 | Cameron et al. | 379/114.01 |

* cited by examiner

Primary Examiner—Rexford Barnie
(74) Attorney, Agent, or Firm—Erik B. Cherdak; Steptoe & Johnson LLP

(57) ABSTRACT

System and method for facilitating consolidated billing within a converging telecommunications network. The system and method include and involve a network resource control facility communicating with and controlling a plurality of network resources within a merged telecommunications network to deliver at least one merged communications service. Each network resource is configured to provide a communications function and to generate corresponding billing data. The network resource control facility is configured to consolidate the billing data from at least one network resource from the plurality of network resources in real-time related to at least one telecommunications service provided within said telecommunications network to generate consolidated billing data. The system and method further include an interface facility which is accessible via a network connection and which is configured to access the network resource control facility to receive the consolidated billing data to produce a consolidated billing notice related to the telecommunications service(s) that are provided.

13 Claims, 6 Drawing Sheets

FIG.2B

```
CREATE TABLE pin_mast ({ NO TRIGGER }
    pin                 CHAR (16),
    dnis_set.           CHAR (12),
    customer_number     CHAR (12),
    sub_cust_number     CHAR (18),
    batch_number        INTEGER,
    seq_number          INTEGER,
    retail~plan         CHAR (12),
    cust_ref1           CHAR (15),
    cust_ref2           CHAR (15),
    credit_amount       INTEGER,
    credit_action       SMALLINT,
    original_balance    INTEGER,
    amount_remaining    INTEGER,
    amount_used         INTEGER,
    renewals            SMALLINT,
    creation_date       DATE,
    activation_date     DATE,
    expiration date     DATE,
    first_use           DATE,
    last_use            DATE,
    init_exp_days       SMALLINT
    last_exp_days       SMALLINT,
    last_vert           INTEGER,
    last_horiz          INTEGER,
    last_lata           CHAR (4),
    pin_status          CHAR (1),
    pattern_set_id      SMALLINT,
    post_pin_branding   CHAR (24),
    hit_date            DATE,
    hit_period          SMALLINT,
    hit_charge          SMALLINT,
    hit_count           SMALLINT, PRIMARY KEY     (pin, customer_number, dnis_set)
                        CONSTRAINT pin_mast_pk,
    FOREIGN KEY     (customer_number, sub_cust_number) REFERENCES
                    sub_cust_mast CONSTRAINT pin~mast_fk1,
    FOREIGN KEY     (customer_number, dnis_set) REFERENCES dnis_set_mast
                        CONSTRAINT pin_mast_fk2,
    FOREIGN KEY     (customer_number, batch_number) REFERENCES batch_mast
                        CONSTRAINT pin_mast_fk3,
    FOREIGN KEY     (pin_status) REFERENCES pin_status_mast
                        CONSTRAINT pin_mast_fk4,
    FOREIGN KEY     (customer_number, retail_plan)
                        REFERENCES rate_mast CONSTRAINT pin_mast_fk5
```

NETWORK *HP*

Longview Service Bureau (NET)

Prepaid/Debit Card Invoice

Billed To: NET FourCORP  
Address Info:  
More Address Info:  
More Address Info:

Invoice: 2797  
Period Beginning: 2000-02-15 00:00:00  
Period Ending: 2000-02-21 00:00:00  
Created: 2000-02-22 00:4:00

Customer: NET

| Destination | Orig. Calls | Orig. Mins | Orig. Rate | Orig. | Term Calls | Term Mins | DS OB Rate | Term Charges | Total Charges |
|---|---|---|---|---|---|---|---|---|---|
| *Incomplete/Abandoned* | 643 | 241.9 | 2.8000 | 6.77 | 0 | 0.0 | 0.0000 | 0.00 | 6.77 |
| Intrastate | 288 | 212.8 | 2.8000 | 5.96 | 0 | 0.0 | 0.0000 | 0.00 | 5.96 |
| Intrastate | 1136 | 6426.1 | 2.8000 | 179.93 | 1136 | 5784.3 | 2.5000 | 144.61 | 324.54 |
| Intrastate | 300 | 203.2 | 2.8000 | 5.69 | 0 | 0.0 | 0.0000 | 0.00 | 5.69 |
| Intrastate | 1230 | 9192.0 | 2.8000 | 257.38 | 1230 | 8499.9 | 2.5000 | 212.50 | 469.87 |
| Intrastate | 1 | 1.1 | 11.000 | 0.12 | 1 | 0.3 | 2.5000 | 0.00 | 0.13 |
| Puerto Rico | 16 | 11.3 | 2.8000 | 0.32 | 0 | 0.0 | 0.0000 | 0.00 | 0.32 |
| Puerto Rico | 4 | 17.7 | 2.8000 | 0.50 | 4 | 15.6 | 7.9000 | 1.23 | 1.73 |
| Canada | 55 | 41.0 | 2.8000 | 1.15 | 0 | 0.0 | 0.0000 | 0.00 | 1.15 |
| Canada | 115 | 800.8 | 2.8000 | 22.42 | 115 | 746.1 | 3.6000 | 26.86 | 49.28 |
| Mexico Band 1 | 2 | 1.5 | 2.8000 | 0.04 | 0 | 0.0 | 0.0000 | 0.00 | 0.04 |
| Mexico Band 2 | 1 | 0.5 | 2.8000 | 0.01 | 0 | 0.0 | 0.0000 | 0.00 | 0.01 |

SYSTEM AND METHOD FOR BILLING COMMUNICATIONS SERVICES PROVISIONED ON DEMAND IN CONVERGING TELECOMMUNICATIONS NETWORK

BACKGROUND OF THE INVENTION

1. Field of the Invention

The present invention relates to systems and methods used to consolidate billing and accounting data and practices in converging telecommunications networks. More particularly, the present invention relates to systems and methods used to receive billing information from disparate telecommunications devices which may be operated by a multitude of telecommunications vendors.

2. Description of the Related Art

Today's telecommunications industry is a crowded one in which customers and service providers are being increasingly linked together via converging networks, such as in the case of converging voice and data networks. As such, a growing trend to make communications services available over publicly accessible networks such as the Internet increases the need for open, multi-vendor, multi-protocol networks and systems. Such a trend has been realized as result of the fact that service providers and others have found that closed, single-vendor, single-protocol networks are, difficult, if not impossible, to create and manage, are not scalable to meet future communications needs, and do not permit consumers to self-direct their communications needs.

As the need for more and enhanced services to be provided via the Internet increases, for example, consumers of telecommunications services will demand greater numbers of customized services, such as enhanced video-conferencing, increased bandwidth, etc. Additionally, consumers requiring greater control of their services will require the ability to self-provision and direct the provision of services "on demand." Currently, providing such on-demand and often customized services and network based solutions such as those to be provided via the Internet is prohibited both in terms of capability and cost. For example, a single network solution or service (e.g., enhanced bandwidth for specific network events, etc.) now requires the concerted cooperation of several telecommunication providers and may involve the operation and control of devices manufactured and controlled by a multitude of vendors, some of which may operate based on unique and, possibly, proprietary protocols. Such disparate systems and the network resources used to deliver network services ultimately may not interface with other telecommunications devices without requiring significant effort in terms of customization and configuration. And, then, if such services can ultimately be provisioned by pre-arranging vendor relationships and pre-configuring hardware and software solutions, consumers may face costs associated with such customized services that far out weigh any benefits.

Another problem facing consumers and telecommunications providers alike, is the inability to provide consolidated billing and accounting information to facilitate purchasing and supplying of telecommunications services. Such problems are exacerbated when thought of in the context of converging networks where many different types of transport across many different network layers supporting voice and data applications may be custom-linked to service a particular customer need. While some vendors such as MCI/MCI WORLDCOM, INC. have offered "one" type billing systems wherein consolidated billing and accounting information related to a host of services (e.g., voice bandwidth, data bandwidth, cellular) purchased by a particular a customer is made available to that customer, such systems typically are single-vendor based, are directed to a single, particular customer, and merely refer to purchases of pre-configured service offerings. Such prior consolidated billing schemes offered no way of consolidating billing and accounting information related to one or more services that, in fact, are custom configured based on a particular customers on-demand provisioning choices, etc.

Thus, there exists a need to provide new and improved systems and methods to provision network resources in converging telecommunications networks such as converging voice and data networks to deliver merged, services based on customer needs on demand, and, thus, to consolidate billing and accounting data related to such merged services. To be viable such systems and methods must support legacy systems and integrate new technologies seamlessly so that consumers of telecommunications services can obtain a breadth of feature rich services and receive consolidated billing and accounting statements. Such systems and methods must support various network technologies, facilitate communications within multi-protocol networks, and permit consolidated billings and accounting schemes. And, such new and improved systems and methods must permit consumers of telecommunications services to self-provision and self-direct their telecommunications services from within easily usable interfaces such as Internet and web based interfaces that support communications service provision on demand.

The present invention addresses the aforementioned problems and needs squarely and provides such new and improved systems and methods as described below.

SUMMARY OF THE INVENTION

The present invention solves the aforementioned problems and provides new and improved systems and methods for integrating network resources within converging telecommunications networks to provision communications services and to consolidate billing data generated by disparate telecommunications devices. Such systems and methods are capable of enabling providers of services to link with other providers seamlessly to provide enhanced services over voice and data networks especially over publicly accessible networks such as the Internet. Consumers of telecommunications services will benefit from the present invention by obtaining greater control over their communications needs and, in particular, will gain the ability to self direct and self-provision the services they need, and the ability to receive consolidated billing notices and the like.

The present invention solves the aforementioned problems and delivers the above-stated benefits by providing new and improved systems and methods for facilitating consolidated billing within a converging telecommunications network. The system and method include and involve a network resource control facility communicating with and controlling a plurality of network resources within a merged telecommunications network to deliver at least one merged communications service. Each network resource is configured to provide a communications function and to generate corresponding billing data. The network resource control facility is configured to consolidate the billing data from at least one network resource from the plurality of network resources in real-time related to at least one telecommunications service provided within said telecommunications network to generate consolidated billing data. The system and method further include an interface facility which is accessible via a network connection and which is configured to access the network resource control facility to receive the consolidated billing data to produce a consolidated billing notice related to the telecommunications service(s) that are provided.

The present invention is discussed in detail below with regard to several attached drawing figures which are next described briefly.

BRIEF DESCRIPTION OF THE DRAWINGS FIGURES

The present invention is described in detail below with reference to the attached drawing figures, of which:

Figure 1:
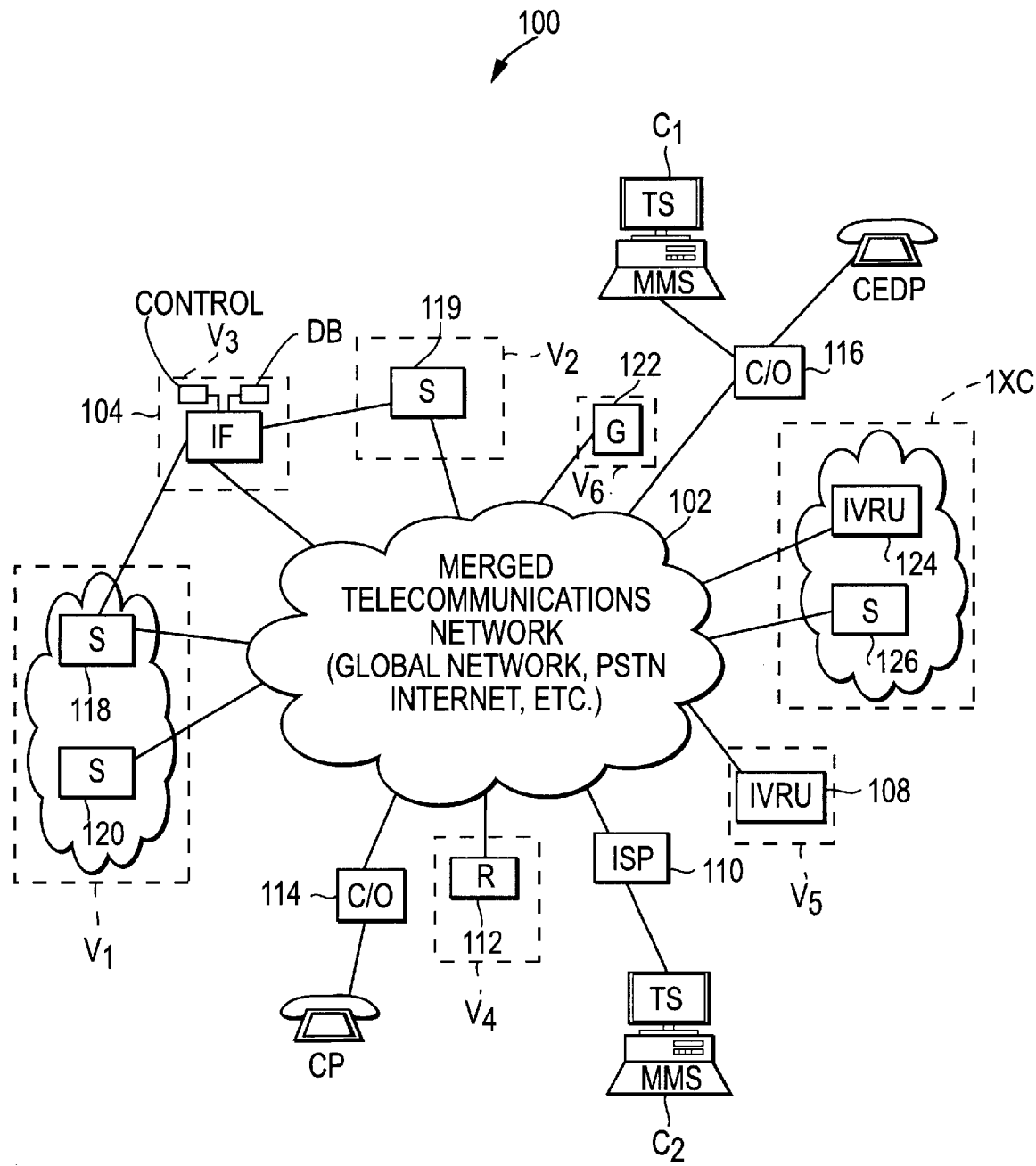
FIG. 1 is a diagram of a system in which telecommunications services may be provisioned and in which consolidated billing and accounting data may be generated and collected based on customer requests received in real time and on-demand.
Figure 2A:
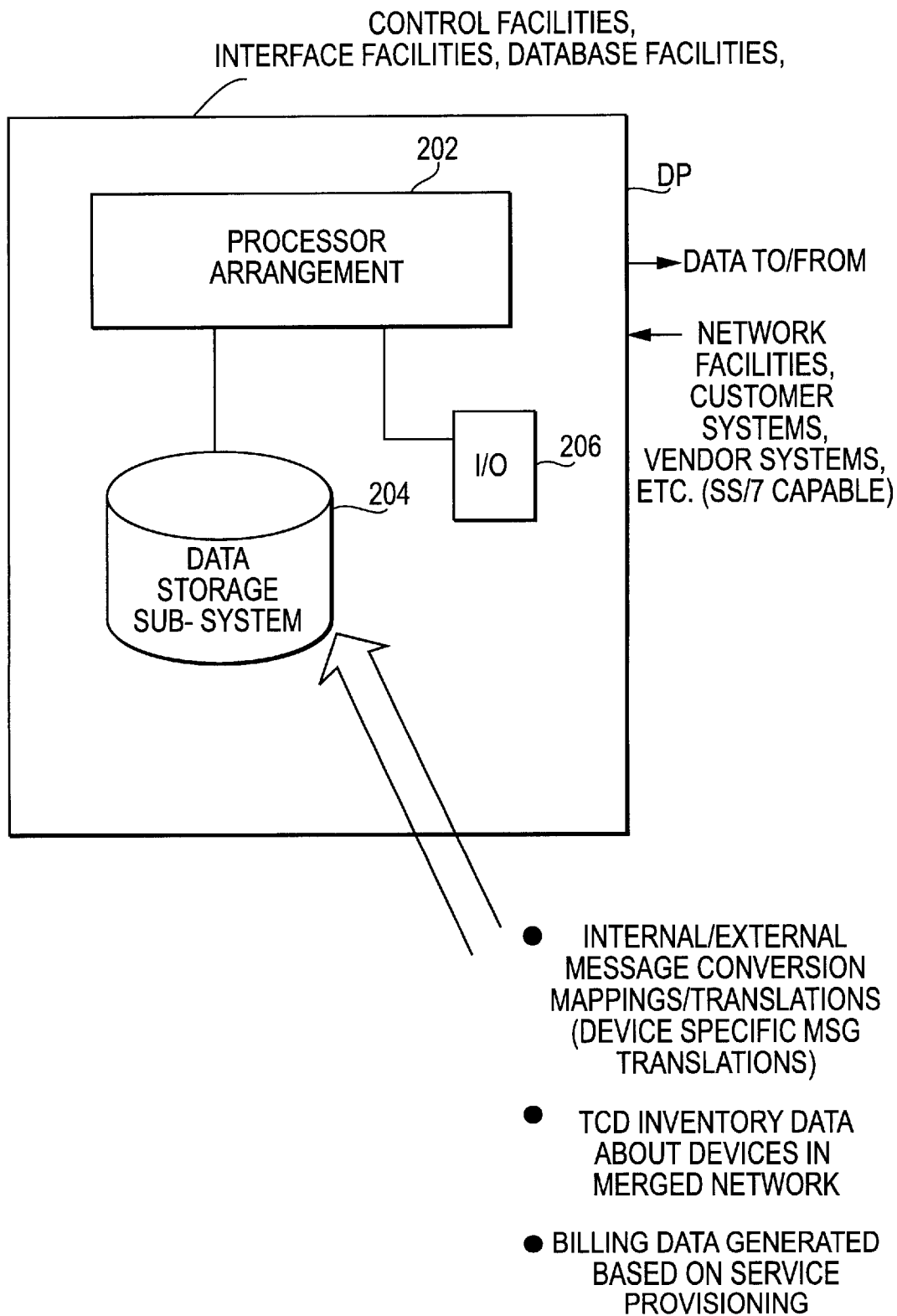
FIG. 2A is a block diagram of a data processing system that may be used to implement control systems, interfacing facilities, and database management facilities in accordance with a preferred embodiment of the present invention.
Figure 2B:
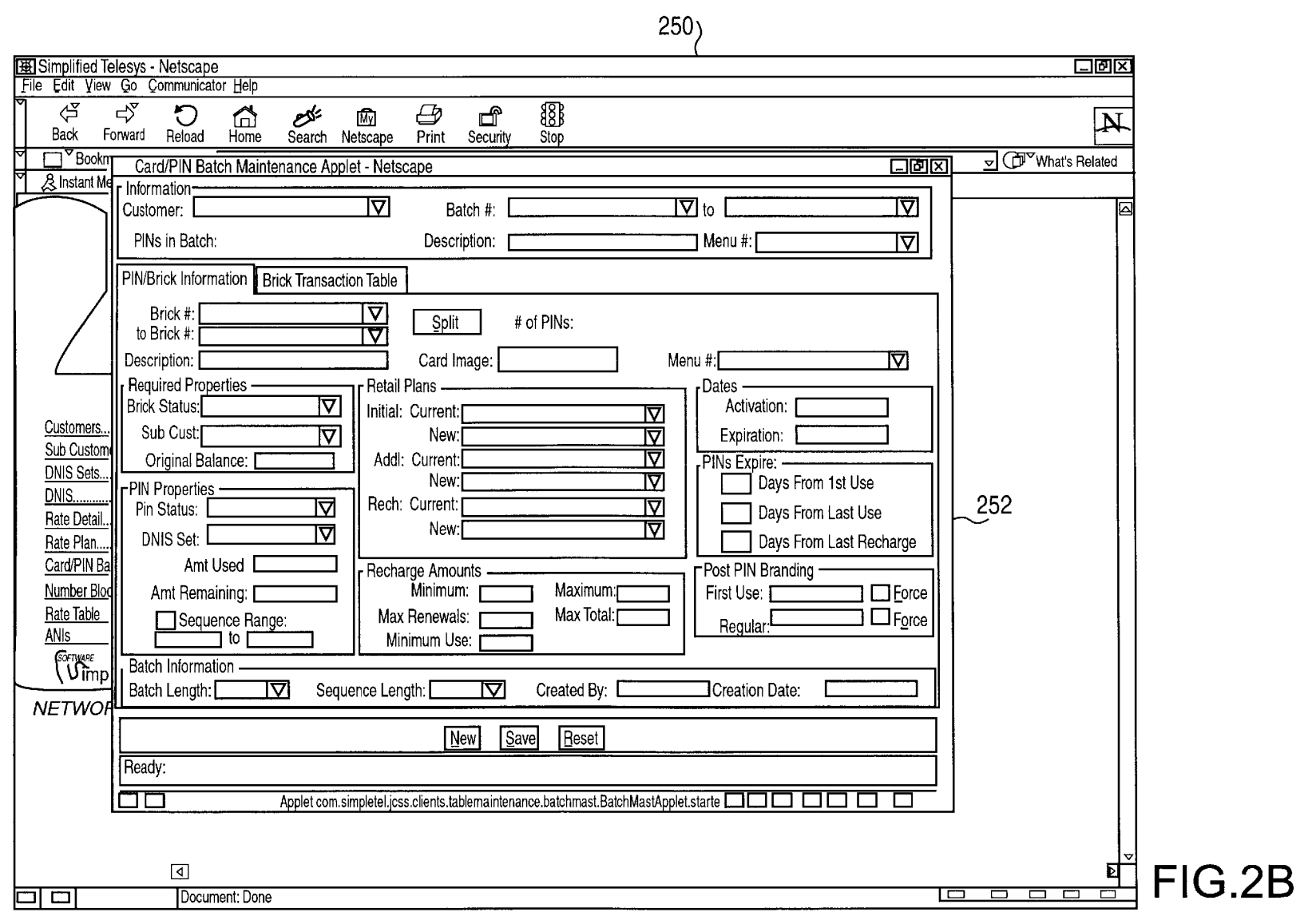
Figure 3:
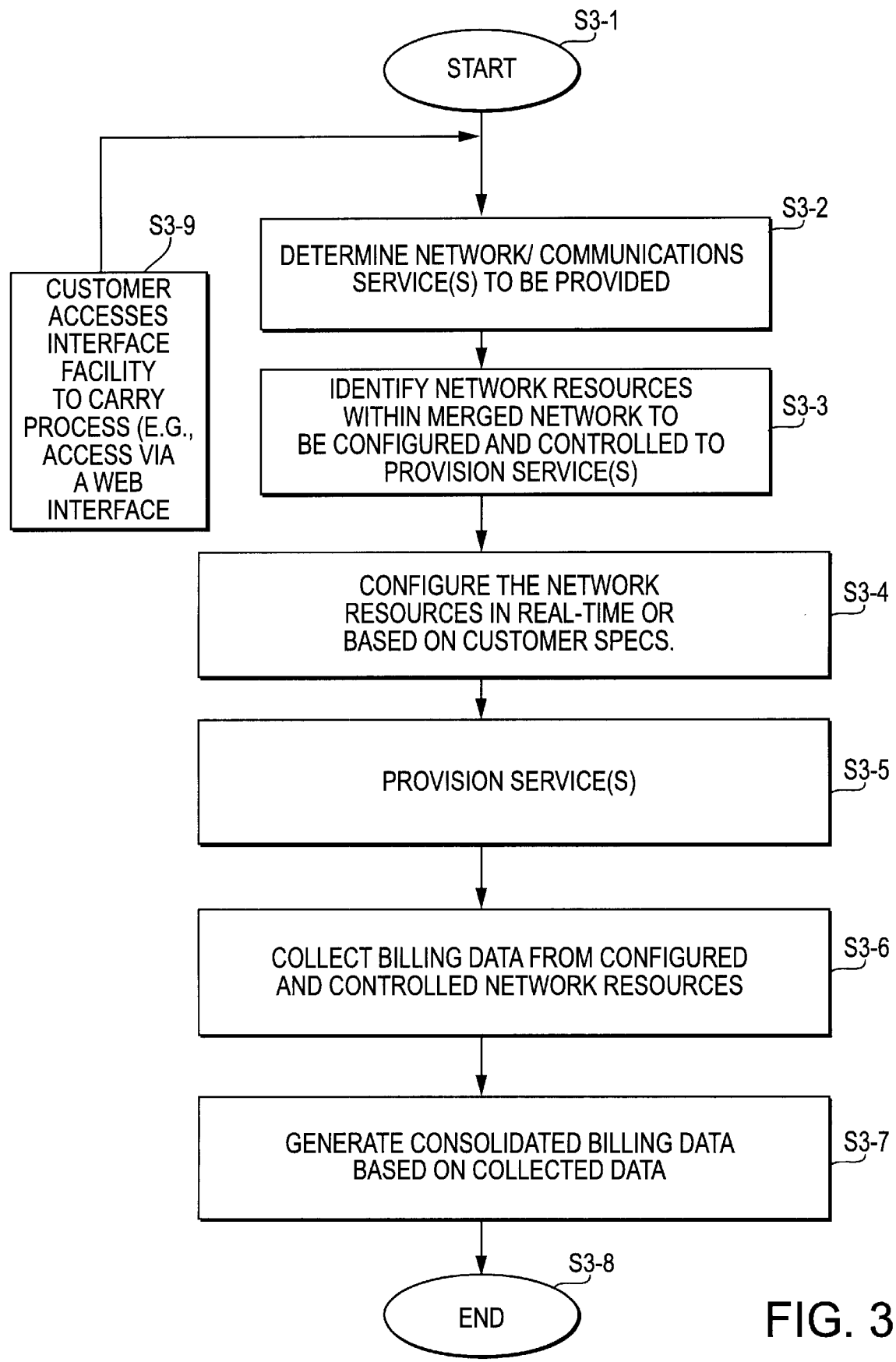

FIG. 2B is a screen shot of a user interface (UI) screen manifested as a Java Applet within a web browser application to facilitate telecommunications service provisioning in accordance with a preferred embodiment of the present invention and, in particular, pre-paid calling card/PIN services such as batch processing maintenance related to activating whole batches of card accounts based on customer specifications established via a web connection and in real time;

FIG. 2C is a database scheme/record format/structure configured to control the storage attributes of data collected in regard to the UI depicted in FIG. 2B;

FIG. 2D is a screen :shot of a consolidated billing notice provided within a web browser application in accordance with a preferred embodiment of the present invention; and FIG. 3 is a flowchart that illustrates salient operations and processes that may be carried out within the system shown in FIG. 1 to facilitate provisioning of and billing practices related to telecommunications services in real time and on-demand.

DETAILED DESCRIPTION OF THE PREFERRED EMBODIMENTS

The present invention is now discussed in detail with regard to the attached drawing figures which were briefly described above. Unless otherwise indicated, like parts and processes are referred to with like reference numerals.

Structural Aspects of the Present Invention

Referring now to FIG. 1, depicted therein is a diagram of a system in which customers may access a merged telecommunication network to receive merged telecommunications services in accordance with a preferred embodiment of the present invention. In particular, system 100 includes a merged telecommunications network which may include at least portions of a global network, the publicly switched telephone network (PSTN), the Internet (and world wide web), etc. Moreover, system 100 may include vendor communications systems V1 through V6 (among others), wherein each vendor system may include switching systems, interactive voice response units, control facilities and database management facilities, interfacing facilities and a host of other telecommunications devices found in modem telecommunications networks and which may be accessed in merged telecommunications network 102 using a variety of modern communications protocols and device messaging schemes.

In system 100, a calling party such as calling party CP may utilize calling services through a central office 114 which is coupled to merged telecommunications network 102 to receive telecommunication services based upon communications functions provided by telecommunications devices such as those provided by vendors V1–V6. For example, a particular telecommunications service may include the operations of a router such as router 112 in the context of data based telecommunications services, voice response services, such as those provided by vendor V5 via IVRU unit 108, gateway services provided by gateway system 122 which is provided by vendor V6, etc. Moreover, telecommunications services may include voice calls which ultimately terminate at a called party such as CEDP party via central office 116. Furthermore, customer systems C1 and C2 may incorporate multimedia telecommunications systems including computing platforms that facilitate multimedia communications via merged telecommunications network 102. Such services may be provided via vendor systems V1, V3 along with an Inter-Exchange Carrier system denoted by system IXC (denoted by phantom lines forming a box around a vendor network that includes interactive voice response unit (IVRU) 124 and a switching platform 126).

Within system 100, vendor V3, for example, is shown to include control facilities, database management facilities and an interfacing facility. The control facilities in conjunction with the database facilities and the interfacing facility, permit customers to custom configure (self-direct) telecommunications services on demand and in real time (e.g., during normal business operations) via couplings made automatically within the merged telecommunications network 102. For example, interfacing facility IF vendor system V3 may incorporate switching facilities 118, 119, and 120 along with IVRU facilities 108 to provide a custom configured telecommunications service in real time. That is, each communications function provided by a particular telecommunications device or facility within system 100 may be treated as an inventory item within merged telecommunications network 102, for example, to facilitate custom configuration of telecommunications services on demand and based on customer requirements. Accordingly, a customer such as customer C2 may access merged telecommunications network 102 and ultimately, interfacing facility IF of vendor system V3 to custom configure bandwidth allocation services on demand and in real time without the need to request such services in advance and via live operator intervention. Accordingly, customer C2 may access an ISP system 110 to provide access to merged telecommunications network 102, for example, to engage the operations of interfacing facility IF of vendor system V3 in the abstract so that in the event that communications functions provided by disparate telecommunications devices are needed to fulfill a particular customer request, it then can be provisioned in the abstract without requiring the customer to specifically understand or be able to message to possibly disparate telecommunications devices. Furthermore, a customer requiring merged voice and data type communications services now may access a merged telecommunication network in consideration of the present invention to ultimately access IXC services, such as voice response and switching services provided IVRU facilities 124 and switching facilities 126 in combination with other services provided within merged telecommunications network 102 to provision enhanced telecommunications services on demand and in real time based upon specific customer specifications.

Furthermore, the interfacing facilities provided by vendor V3, for example, permit telecommunications devices and facilities within merged telecommunications network 102 to transmit billing and accounting data related to the provision telecommunications services to a central or otherwise consolidated data facility such as data facility 104 which includes interfacing facilities, control facilities and database facilities, and to ultimately, provide such consolidated billing data to a customer for appropriate processing thereby. For example, in the event that extended or extra bandwidth is a telecommunications service to be provided within merged telecommunications network 102 at the request of a customer in real time, such extended bandwidth may require certain switching facilities, such as switching facility 118, and switching facility 119, to be including in the provision of that particular bandwidth telecommunications service. Accordingly, the present invention now permits switching system 118 and switching facility 119, for example, to transmit billing data to a consolidated billing facility whereby billing data, possibly incorporating billing data generated by disparate telecommunications devices (e.g., devices communicating and messaging in accordance with disparate telecommunications protocols, etc.), communicating in accordance with disparate protocols and messaging schemes, to be consolidated and ultimately reported within a single or consolidated notice or message provided via merged telecommunication network 102.

The operations of interface facility IF within vendor system V3, are illustrated and described in detail in co-owned, co-pending U.S. patent application Ser. No. 09/414,668, filed on Oct. 7, 1999, which is incorporated herein by reference. Accordingly, the reader of this patent document should refer to the aforementioned co-owned, co-pending U.S. patent application for complete disclosure details related to the operations of interfacing facility IF in the context of provisioning and providing consolidated billing operations in accordance with the present invention.

Referring now to FIG. 2A, depicted therein is a block diagram of a computing system which may be used to implement control facilities, interfacing facilities and database management facilities as described above with regard to FIG. 1 in accordance with a preferred embodiment of the present invention. In particular, FIG. 2A depicts a data processing system DP which further includes a processor arrangement 202 including one or more processing elements, a data storage subsystem 204, an IO facility 206. The arrangement of these structures shown with data processing system DP will be immediately understood by those skilled in the art.

Data processing system DP is configured to receive and transmit data to and from network facilities, customer systems, vendor systems, etc. via modern telecommunications protocols including, but not limited to, those used in SS/7 out-of-band signaling systems, TCPIP protocols, H.323 communications protocols, and any other telecommunications protocols which may used to facilitate messaging between telecommunications devices in accordance with the present invention.

Data storage subsystem 204 as shown within data processing system DP, will include internal and external messaging conversion mappings and translations, which may be used to convert device specific messages (external messages) generated by specific telecommunications devices within merged telecommunications network 102 (FIG. 1) into internal messages (IMs) which are device independent which may be used to consolidate application type data to including billing operation data etc. Data storage subsystem 204 may store and provide telecommunications device (TCD) inventory data about particular telecommunication devices in merged telecommunications network 102. And, data storage subsystem 204 may including billing data generated based on service provisioning and, in particular, billing data generated by particular telecommunications devices within merged telecommunications network 102.

Referring now to FIG. 2B, depicted therein is a screen shot of a user interface (UI) screen manifested as a Java Applet within a web browser application (such as the NETSCAPE COMMUNICATOR v.4.x web browser) to facilitate telecommunications service provisioning in accordance with a preferred embodiment of the present invention and, in particular, pre-paid calling card/PIN services such as batch processing related to activating whole batches of card accounts based on customer specifications established via a web connection and in real time. In particular, screen shot 250 includes a Java Applet based UI 252 that is configured to permit data entry by a user (a service customer) to engage in a telecommunications function such as batch maintenance related to whole batches of pre-paid communications accounts (e.g., calling cards, etc.). The data values collected and validated in accordance with UI 252 are used to drive the database operations performed at least in part within system 100 (FIG. 1) by database facilities DB. That is, client-based UI 252 is configured to drive back-end database management processing such as database propagation, queries, reporting, etc. The implementation of such back-end operations will be immediately understood by those skilled in the art after reviewing this patent document. Accordingly, the present invention now permits customers such as stores to custom purchase and acquire pre-paid communications accounts, etc. on-demand and through use of automated user interfaces which are accessible via the Internet and web.

Referring now to FIG. 2C, depicted therein is a database scheme/record format/structure configured to control the storage attributes of data collected in regard to the UI depicted in FIG. 2B. For example, the data field identified as "Original Balance" as shown in UI 252 (FIG. 2B), is shown as a data item stored within the format shown in FIG. 2C. Those skilled in the art of programming and database operations will immediately understand the storage aspects of the data items referred to in UI 252 and the actual back-end data storage features of the database structure shown in FIG. 2C.

Referring now to FIG. 2D, depicted therein is a screen shot of a consolidated billing notice provided within a web browser application in accordance with a preferred embodiment of the present invention. In particular, screen shot 260 is a web page provided via a web connection which includes a consolidated billing notice 262 for a fictitious customer NETFOUR CORP. As show, consolidated billing notice 262 includes data related to actual prepaid account usage by customers of NETFOUR CORP. Within consolidated billing notice 262 are billing lines that correspond to billing data generated by at least one telecommunications device (e.g., database facilities like or similar to database facilities DB, IVRU units, switches, etc.) in system 100 (FIG. 1).

Operational Aspects of the Present Invention

The structural aspects of the present invention as described above and which are used to facilitate provisioning of telecommunication services in real time and the consolidated billing operations related to such provisions telecommunications services, are designed and configured in accordance with present to operate together. The operations necessary to carry out such functions and features are next described with reference to FIG. 3.

Referring now to FIG. 3, depicted therein is a flow chart that illustrates the operations that may be carried out within system 100 to facilitate the provisioning and corresponding consolidated billing operations related to such provisioning of customer configured telecommunications services provided in real time and in accordance with the preferred embodiments of the present. In particular, processing and operations start at step S3-1 and immediately proceed to step S3-2. At step S2, a determination will be made as to what network/communication services are to be provided based upon a customer specifications.

Next, as step S3-3, interfacing facilities (IF) along with control facilities and database facilities as shown within system 100 identify the network resources and in particular, the specific telecommunications devices within merged telecommunications network 102, to be configured and controlled to provision the services specified by the customer.

Next, at step S34, interfacing facilities (IF) along with control facilities and database facilities as shown within system 100 will configure the network resources via corresponding messaging (e.g., generation of device-specific messages that are used to control and provision devices within a network system) identified at step S3-3 in real time and based on customer specifications.

Next, at step S3-5, the services which are custom configured and specified by the customer will be provisioned.

Next, at step S3-6, billing data will be collected from the configured and controlled network resources (e.g., the specific devices and facilities within merged telecommunications network used to provision the desired services), and in particular, the specific telecommunications devices used to provision the services specified by the customer. Such billing data will often be device specific type billing data which may transmitted to a central billing facility such as billing facility 104 which may operated by vendor V3 as shown in system 100. Once such consolidated billing data is collected, the same may be manipulated in a consolidated format such as via common database operations which operate upon data stored within common tables regardless of the originating data source. The present invention, via use of interfacing facilities IF, permit such common data collection via translations of device specific messages (e.g., external messages) into internal messages which may include device related operations, data operations, etc.

Next, at step S3-7, consolidated billing data will be generated based upon the data collected during processes illustrated at step S3-6. Such consolidated data may include consolidated table, queries, etc. Any type of data structure which may be used to provide a common data messaging interface may be used within the context of the present invention.

Processes and operations ends at step S3-8.

An additional step, step, S3-9, may be added to the processes and operations illustrated within FIG. 3 to point out that a customer may access interface facility IF within system 100 to carryout the processes illustrated within the flow chart shown in FIG. 3. Such access may occur via a customer system and a network connection such as one which accesses a global network like or similar to the Internet and WWW. Such access may occur via customer system C2 which may be linked to the merged telecommunication network 102 via the Internet.

To facilitate the operations of step S3-7, the following computer program listing identifies Java programming language constructs that may be used to implement a UI applet such as one similar or like UI 252 (FIG. 2B). Those skilled in the art will immediately understand the constructs identified in the following computer listing after reviewing the same:

```
package com.simpletel.jcss.clients.tablemaintenance.batchmast;

public class BatchMast extends JPanel {
    public BatchMastClient clientInterface;
    private JPanel mainPane;
    private JPanel customerPane;
    private JLabel customer_numberLabel;
    private JComboBox customer_numberCombo;
    private JLabel customer_nameLabel;
    private JTextField customer_nameField;
    private JLabel sub_cust_numberLabel;
    private JComboBox sub_cust_numberCombo;
    private JLabel sub_cust_naneLabel;
    private JTextField sub_cust_nameField;
    private JLabel batch_numberLabel;
    private JComboBox batch_numberStartCombo;
    private JLabel batch_numberEndLabel;
    private JComboBox batch_numberEndCombo;
    private JLabel descriptionLabel;
    private JTextField descriptionField;
    private JPanel batchPane;
    private JLabel pins_in_batchLabel;
    private JTextField pins_in_batchField;
    private JLabel max_recharge_amtLabel;
    private JTextField max_recharge_amtField;
    private JLabel creation_date;
    private JTextField creation_dateField;
    private JLabel max_recharge_ttlLabel;
    private JTextField max_recharge_ttlField;
    private JLabel expiration_dateLabel;
```

```
private JTextField expiration_dateField;
private JLabel max_renewalsLabel;
private JTextField max_renewalsField;
private JPanel rangePane;
private JLabel rangeLabel;
private JComboBox batchPadCombo;
private JComboBox seqPadCombo;
private JRadioButton allRadio;
private JRadioButton fromRadio;
private JTextField fromField;
private JLabel toLabel;
private JTextField toField;
private JPanel userPane;
private JLabel user_who_addedLabel;
private JTextField user_who_addedField;
private JLabel when_addedLabel;
private JTextField when_addedField;
private JLabel user_who_changedLabel;
private JTextField user_who_changedField;
private JLabel when_changedLabel;
private JTextField when_changedField;
private JLabel card_codeLabel;
private JTextField card_codeField;
private JPanel pinPane;
private JLabel original_balanceLabel;
private JTextField original_balanceField;
private JLabel retail_planLabel;
private JComboBox retail_planCombo;
private JLabel anount_usedLabel;
private JTextField amount_usedField;
private JLabel amount_remainingLabel;
private JTextField amount_remainingField;
private JLabel dnis_setLabel;
private JComboBox dnis_setCombo;
private JLabel activation_dateLabel;
private JTextField activation_dateField;
private JTextField post_pin_brandingField;
private JLabel post_pin_brandingLabel;
private JLabel pin_statusLabel;
private JComboBox pin_statusCombo;
private JLabel userpin_statusLabel;
private JComboBox userpin_statusCombo;
private JLabel pinExpLabel;
private JTextField init_exp_daysField;
private JLabel init_exp_daysRightLabel;
private JTextField last_exp_daysField;
private JLabel last_exp_daysRightLabel;
private JLabel dateTimeLabel;
private JTextField dateTimeField;
private JCheckBox retroCheckBox;
private JPanel buttonpanel;
private JButton     btnNew;
private JButton     btnSave;
private JButton     btnCancel;
private StatusBar   statusBar;
public String    ip;
public Vector        customers;
public Hashtable    htCustomers;
public Vector        subCustomers;
public Hashtable    htSubCustomers;
public Vector        batchNumbers;
public Vector        dnisSets;
public Hashtable    htDnisSets;
public Hashtable    htRatePlans;
public Hashtable    htStatus;
public final static int NEW = 1;
public final static int MODIFY = 0;
private int         state = BatchMast.MODIFY;
public String       username;
private boolean     registered = false;
private Font        f=new Font ("Monospaced",Font.PLAIN,12);
private BatchInfo cached;
private BatchItemAdapter      bia;
private BatchEndItemAdapter   beia;
private boolean canAdd = false;
private boolean canMod = false;
private boolean canView = false;
private boolean canAdmin = false;
private String dateFormat = "M/d/7";
```

-continued

```
    private Thread loadThread;
    private final int LDAD_ALL = 1;
    private final int LOAD_BATCH = 2;
    private final String currencyLabel = "$";
    private int MAX_BATCHES_TO_SHOW = 100;
    private int firstVisibleStartBatch;
    private int lastVisibleStartBatch;
    private int firstVisibleEndBatch;
    private int lastVisibleEndBatch;
    private final static String nextBatchText = "View Next";
    private final static String prevBatchText = "View Previous";
    private final static String blankstring = "      ";
    private boolean noRender = false;
    private boolean supportcallBacks = true;
    private String[] padRange =
{blankstring, "Default", "1", "2", "3", "4", "5", "6", "7", "8", "9", "10", "11", "12", "13", "14", "15", "16",};
    //fee pane initialization
    JPanel feePanel = new JPanel();
    JRadioButton feeSemiRadio = new JRadioButton();
    JLabel daysLabel = new JLabel();
    JRadioButton feeMonthRadio = new JRadioButton();
    JTextField feeDaysField = new JTextField();
    JLabel everyLabel = new JLabel();
    JRadioButton feeDayIntervalRadio = new JRadioButton();
    JRadioButton feeTurmOffRadio = new JRadioButton();
    JTextField feeAmtField = new JTextField();
    JLabel feeAmtLabel = new JLabel();
    JRadioButton todayRadio = new JRadioButton();
    JRadioButton specifyDateRadio = new JRadioButton();
    JLabel centsLabel = new JLabel();
    JTextField specifyDateField = new JTextField();
    JLabel feeStartDateLabel = new JLabel();
    JRadioButton feeEnabledRadio = new JRadioButton();
    JRadioButton disabledRadio = new JRadioButton();
    JLabel feeBillingLabel = new JLabel();
    JLabel feeScheduleLabel = new JLabel();
    JTabbedPane pinTabbedPane = new JTabbedPane();
    JPanel feeInfoPanel = new JPanel();
    JPanel feeSchedPanel = new JPanel();
    boolean feeChange = false;      //flag set if the fee information has changed.
    string executionStartTime=null; //Pulled from the web_user_mast table in the database. Default
    //time for batch creation or modification to be run.
    String executionEndTime=null;
    private double versionNumber = 1.0;
    string origSubCust;
    boolean loadBatchData=true;
    ActionThread action;
    boolean isStartBatch=false;
    private final int LOAD_SUB_CUST = 3;
    private final int SAVE =4;
    boolean subDisabled=false;
    public BatchMast(String username, String ip_data, boolean supportCB) {
        this.usemame = usemame;
        ip = ip_data;
        supportCallBacks = supportCB;
        setVersionNumber (1.14);
        SetLayout (new BorderLayout ());
        mainPane = new JPanel(null);
        mainPane.setBounds(0,0,620,435)
        add(mainPane);
        //mainpane.addMouseListener(this);
        //0,0 Add CustomerPane to (main)
        customerPane = new JPanel(null);
        customerPane.setBorder(new TitleBorder(new EtchedBorder(),"Information"));
        customerPane.setBounds(new Rectangle(0, 0, 620, 131));
        mainPane.add(customerPane,null);
        //0,0 Add cust. number label (cust)
        customer_numberLabel = new JLabel("Customer");
        customer_numberLabel.setBounds(new Rectangle(15, 20, 80, 15));
        customerPane.add(customer_numberLabel);
        //1,0
        customer_numberCombo = new JComboBox();
        customer_numberCombo.setBounds(new Rectangle(105, 16, 195, 24));
        customerPane.add(customer_numberCombo);
        //2,0
        sub_cust_numberLabel = new JLabel ("Sub Customer");
        sub_cust_numberLabel.setBounds(new Rectangle(317, 21, 100, 15));
        customerPane.add(sub_cust_numberLabel);
        //3,0
```

-continued

```
sub_cust_numberCombo = new JComboBox();
sub_cust_numberCombo.setBounds(new Rectangle(405, 17, 195, 24));
customerPane.add(sub_cust_numberCombo);
//0.1
batch_numberLabel = new JLabel ("Batch Number");
batch_numberLabel.setBounds(new Rectangle(15, 56, 80, 15));
customerPane.add(batch_numberLabel);
//1,1
batch_numberStartCombo = new JComboBox();
batch_numberStartCombo.setBounds(new Rectangle(105, 51, 195, 24));
customerPane.add(batch_numberStartCombo);
//2,1
batch_numberEndLabel = new JLabel ("to");
batch_numberEndLabel.setBounds(new Rectangle(360, 58, 22, 15));
customerPane.add(batch_numberEndLabel);
//3,1
batch_numberEndCombo = new JComboBox();
batch_numberEndCombo.setBounds(new Rectangle(405, 51, 195, 24));
customerPane.add(batch_numberEndCombo);
//0.2
descriptionLabel = new JLabel("Description");
descriptionLabel.setBounds(new Rectangle(15, 88, 72, 15));
customerPane.add (descriptionLabel);
//1,2
descriptionField = new JTextField();
descriptionField.setBounds(new Rectangle(105, 86. 510, 19));
customerPane.add (descriptionField);
pinTabbedPane.setBounds(new Rectangle(0, 140, 617, 225));
//0.1 (Batch Pane)
batchPane = new JPanel(null);
batchPane.setBorder(new TitledBorder(new EtchedBorder(),"Batch Information"));
batchPane.setBounds(new Rectangle(0, 0, 411, 185));
//mainPane.add(batchPane);
//0,0 add pins in batch (batch)
pins_in_batchLabel = new JLabel("Pins in Batch");
pins_in_batchLabel.setBounds(new Rectangle(18, 21, 80, 15));
batchPane.add(pins_in_batchLabel);
//1,0
pins_in_batchField = new JTextField(8);
pins_in_batchField.setEditable(false);
pins_in_batchField.setBounds(new Rectangle(109, 20, 68, 19));
batchPane.add(pins_in_batchField);
//2,0
max_recharge_amtLabel = new JLabel("Max. Recharge Amount");
max_recharge_antLabel.setBounds(new Rectangle(186, 22, 136, 15));
batchPane.add(max_recharge_amtLabel);
//3,0
max_recharge_amtField = new JTextField(6);
max_recharge_amtField.setBounds(new Rectangle(324, 21, 68, 19));
batchPane.add(max_recharge_amtField);
//0.1
creation_date = new JLabel("Creation Date");
creation_date.setToolTipText("This date generated upon batch creation");
creation_date.setBounds(new Rectangle(19, 55, 80, 15));
batchPane.add(creation_date);
//1,1
creation_dateField = new JTextField(8);
creation_dateField.setEditable(false);
creation dateField.setBounds(new Rectangle(109, 53, 68, 19));
batchPane.add(creation_dateField);
//2,1
max_recharge_ttlLabel = new JLabel("Max. Recharge Total");
max_recharge_ttlLabel.setBounds(new Rectangle(187, 56, 130, 15));
batchPane add(max_recharge_ttlLabel);
//3,1
max_recharge_ttlField = new JTextField(6);
max_recharge_ttlField.setBounds(new Rectangle(324, 54, 66, 19));
batchPane.add(max_recharge_ttlField);
//0.2
expiration_dateLabel = new JLabel("Expiration Date");
expiration_dateLabel.setToolTipText("Enter Expiration date of PIN");
expiration_dateLabel.setBounds(new Rectangle(18, 86, 85, 15));
batchPane.add(expiration_dateLabel);
//1,2
expiration_dateField = new JTextField(8);
expiration_dateField.setBounds(new Rectangle(108, 85, 68, 19));
batchPane.add(expiration_dateField);
max_renewalsLabel = new JLabel("Max Renewals");
max_renewalsLabel.setBounds(new Rectangle(186, 87, 120, 15));
```

-continued

```
        batchPane.add(max_renewalsLabel);
        max_renewalsField = new JTextField(6);
        max_renewalsField.setBounds(new Rectangle(324, 86, 68, 19));
        batchPane.add(max_renewalsField);
        JLabel batchPadLabel = new JLabel("Batch Length");
        batchpadLabel.setBounds(new Rectangle(18, 118, 90, 15));
        //batchPadLabel.setToolTipText("Set a value here if you need\na constant length batch
number\nie. setting Batch Length to\n8 will convert batch 1234\nto 00001234. 'Default' allows\nvariable
length batch numbers");
        batchPadLabel.setToolTipText("Set value for constant length, zero padded batch numbers");
        batchPane.add(batchPadLabel);
        batchPadCombo = new JComboBox(padRange);
        batchPadCombo.setBounds(new Rectangle(108, 117, 68, 19));
        batchPane.add(batchPadCombo);
        rangeLabel = new JLabel("Range of PINs    ");
        JLabel seqPadLabel = new JLabel("Sequence Length");
        seqPadLabel.setBounds(new Rectangle(186, 118, 120, 15));
        batchPane.add(seqPadLabel);
        //seqPadLabel.setToolTipText("Set a value here if you need\na constant length
sequence\nie. setting Sequence Length to\n8 will convert sequence 1234\nto 00001234. 'Default'
allows\nvariable length sequences");
        seqpadLabel.setToolTipText("Set value for constant length, zero padded sequence numbers");
        seqPadCombo = new JComboBox(padRange);
        seqPadCombo.setBounds(new Rectangle(324, 117, 68, 19));
        batchPane.add(seqPadCombo);
        rangeLabel = new JLabel("Range of PINs    ");
        rangeLabel.setBounds(new Rectangle(18, 148, 90, 15));
        batchPane.add(rangeLabel);
        allRadio = new JRadioButton("All");
        allRadio.setBounds(new Rectangle(110, 144, 41, 22));
        allRadio. setActionCommand("all");
        allRadio.addActionListener(new RadioActionAdapter());
        batchPane.add(allRadio);
        fromRadio = new JRadioButton("PIN Range");
        fromRadio.setForeground(rangeLabel.getForeground());
        fromRadio.setBounds(new Rectangle(148, 144, 91, 22));
        fromRadio.setActionCommand("from");
        fromRadio.addActionListener(new RadioActionAdapter());
        batchPane.add(fromRadio);
        ButtonGroup bg = new ButtonGroup();
        bg.add(allRadio);
        bg.add(fromRadio);
        fromField = new JTextField(4);
        fromField.setBounds(new Rectangle(238, 147, 63, 19));
        fromField.setEditable(true);
        batchPane.add(fromField);
        toLabel = new JLabel("to");
        toLabel.setBounds(new Rectangle(310, 148, 16, 15));
        batchPane.add(toLabel);
        toField = new JTextField(4);
        toField.setBounds(new Rectangle(329, 147, 63, 19));
        toField.setEditable(true);
        batchPane.add(toField);
        //1,1 (userPane)
        userPane = new JPanel(null);
        userPane.setBorder(new TitledBorder(new EtchedBorder(),"User Infomation"));
        userPane.setBounds(new Rectangle(411, 0, 206, 185));
        //mainPane.add(userPane);
        //0,0
        user_who_addedLabel = new JLabel("Created By");
        user_who_addedLabel.setBounds(new Rectangle(15, 20, 67, 15));
        userPane.add(user_who_addedLabel);
        //1,0
        user_who_addedField = new JTextField(11);
        user_who_addedField.setEditable(false);
        user_who_addedField.setBounds(new Rectangle(95, 15, 101, 19));
        userPane.add(user_who_addedField);
        //0,1
        when_addedLabel = new JLabel("Date Created");
        when_addedLabel.setBounds(new Rectangle(15, 54, 79, 15));
        userPane.add(when_addedLabel);
        //1,1
        when_addedField = new JTextField(11);
        when_addedField.setEditable(false);
        when addedField.setBounds(new Rectangle(95, 52, 101, 19));
        userPane.add(when_addedField);
        //0,2
        user_who_changedLabel = new JLabel("Modified By");
        user_who_changeLabel.setBounds(new Rectangle(15, 86, 77, 15));
```

-continued

```
userPane.add(user_who_changedLabel);
//1,2
user_who_changedField = new JTextField(11);
user_who_changedField.setEditable(false);
user_who_changedField.setBounds(new Rectangle(95, 84, 101, 19));
userPane.add(user_who_changedField);
when_changedLabel = new JLabel("Date Modified");
when_changedLabel.setBounds(new Rectangle(15, 116, 79, 15));
userPane.add(when_changedLabel);
when_changedField = new JTextField(11);
when_changedField.setEditable(false);
when_changedField.setBounds(new Rectangle(95, 114, 101, 19));
userPane.add(when_changedField);
userpin_statusLabel = new JLabel("Status of PINs");
userpin_statusLabel.setBounds(new Rectangle(15, 149, 102, 15));
userPane.add(userpin_statusLabel);
userpin_statusCombo = new JComboBox();
userpin_statusCombo.setBounds(new Rectangle(95, 145, 101, 24));
userPane.add(userpin_statusCombo);
JPanel batchInfoPane = new JPanel();
batchInfoPane.setLayout(null);
batchInfoPane.setBounds(0,0,617,190);
batchInfoPane.add(batchPane, null);
batchInfoPane.add(userPane, null);
pinTabbedpane.addTab("Batch Information",batchInfoPane)
//0,2 (pinPane)
pinPane = new JPanel(null);
pinPane.setBorder(new TitleBorder(new EtchedBorder() ,"PIN Properties"));
pinPane.setBounds(new Rectangle(0, 0, 617, 190));
//mainPane add(pinPane);
//0,0
original_balanceLabel = new JLabel("original PIN Balance");
original_balanceLabel.setBounds(new Rectangle(16, 20, 122, 15));
pinPane add(original_balanceLabel);
//1,0
original_balanceField = new JTextField();
//      original_balanceField.setColumns(4);
original_balanceField.setBounds(new Rectangle(163, 18, 60, 19));
pinPane add(original_balanceField);
//2.0
retail_planLabel = new JLabel("Retail Plan Name");
retail_planLabel.setBounds(new Rectangle(235, 19, 102, 15));
pinPane.add(retail_planLabel);
//3.0
retail_planCombo = new JComboBox();
retail_planCombo.setBounds(new Rectangle(335, 15, 114, 24));
pinPane.add(retail_planCombo);
//4.0
pinExpLabel = new JLabel("PINs Expire:");
pinExpLabel.setBounds(new Rectangle(460, 21, 75, 15));
pinPane.add(pinExpLabel);
//0,1
amount_usedLabel = new JLabel("Amount Used");
amount_usedLabel.setBounds(new Rectangle(16, 49, 122, 15));
pinPane.add(amount_usedLabel);
//1,1
amount_usedField = new JTextField();
amount_usedField.setBounds(new Rectangle(163, 47, 60, 19));
pinPane.add(amount_usedField);
//2,1
dnis_setLabel = new JLabel("DNIS Set");
dnis_setLabel.setBounds(new Rectangle(235, 52, 102, 15));
pinPane.add(dnis_setLabel);
//3,1
dnis_setCombo = new JComboBox();
dnis_setCombo.setBounds(new Rectangle(335, 48, 114, 24));
pinPane.add(dnis_setCombo);
//0,3
post_pin_brandingLabel = new JLabel("Post PIN Brand");
post_pin_brandingLabel.setToolTipText("Enter a filenane for the Post PIN Branding");
post_pinbrandingLabel.setBounds(new Rectangle(235, 108, 102, 15));
pinPane.add(post_pin_brandingLabel);
//1,3
post_pin_brandingField = new JTextField(" ");
post_pin_brandingField.setBounds(new Rectangle(335, 106, 114, 19));
pinPane.add(post_pin_brandingField);
//4,1
init_exp_daysField = new JTextField();
//      init_expdaysField.setColumns(4);
```

```
init_exp_daysField.setBounds(new Rectangle(459, 52, 29, 19));
pinPane.add(init_exp_daysField);
//5,1
init_exp_daysRightLabel = new JLabel("Days fron Initial Use");
init_exp_daysRightLabel.setBounds(new Rectangle(491, 54, 131, 15));
pinPane.add(init_exp_daysRightLabel);
//0,2
amount_remainingLabel = new JLabel("Amount Remaining");
amount_remainingLabel.setBounds(new Rectangle(16, 79, 122, 15));
pinPane.add(amount_remainingLabel);
//1,2
amount_remainingField = new JTextField();
amount_remainingField.setBounds(new Rectangle(163, 77, 60, 19));
pinPane.add(amount_remainingField);
//2,2
pin_statusLabel = new JLabel("Status of PINs");
pin_statusLabel.setBounds(new Rectangle(235, 85, 102, 15));
pinPane.add(pin_statusLabel);
//3,2
pin_statusCombo = new JComboBox();
pin_statusCombo.setBounds(new Rectangle(335, 81, 114, 24));
pinPane.add(pin_statusCombo);
//4,2
last_exp_daysField = new JTextField();
last_exp_daysField.setBounds(new Rectangle(459, 84, 29, 19));
pinPane.add(last_exp_daysField);
//5,2
last_exp_daysRightLabel = new JLabel("Days from Last Use");
last_exp_daysRightLabel.setBounds(new Rectangle(491, 85, 131, 15));
pinPane.add(last_exp_daysRightLabel);
//0,3
activation_dateLabel = new JLabel("Date PINs become Active");
activation_dateLabel.setRounds(new Rectangle(16, 108, 146, 15));
pinPane.add(activation_dateLabel);
//1,3
activation_dateField = new JTextField("mm/dd/yy");
activation_dateField.setBounds(new Rectangle(163, 106, 60, 19));
pinPane.add(activation_dateField);
pinTabbedPane.addTab("Pin Properties", pinPane);
//monthly fee pane - added 11-19-98
feePanel.setLayout(null);
feePanel.setBounds(new Rectangle(0, 0, 617, 190));
feeMonthRadio.setBounds(new Rectangle(64, 15, 72, 22));
feeMonthRadio setMnemonic('M');
feeSemiRadio.setText("Semi-Monthly");
feeSemiRadio.setMnemonic('S');
feeSemiRadio.setBounds(new Rectangle(64, 37, 108, 22));
daysLabel.setBounds(new Rectangle(170, 65, 30, 15));
feeDaysField.setText(" ");
feeDaysField.setBounds(new Rectangle(119, 60, 42, 25));
feeDaysField.setHorizontalAlignment(JTextField.RIGHT);
everyLabel.setBounds(new Rectangle(85, 65, 41, 15));
feeDayIntervalRadio.setBounds(new Rectangle(64, 60, 17, 22));
feeDayIntervalRadio.setMnemonic('I');
feeDayIntervalRadio.setActionCommand('DaysInt");
feeDayIntervalRadio.addActionListener(new DisableRadioAdapter());
feeAmtField.setText(" ");
feeAmtField.setBounds(new Rectangle(108, 22, 75, 25));
feeAmtField.setHorizontalAlignment(JTextField.LEFT);
feeAmtLabel.setText("Fee Amount");
feeAmtLabel.setBounds(new Rectangle(34, 24, 66, 15));
todayRadio.setText("Today");
todayRadio.setMnemonic('T');
todayRadio.setBounds(new Rectangle(108, 60, 63, 22));
todayRadio.addActionListener(new DisableRadioAdapter());
todayRadio.setActionCommand("Today");
specifyDateRadio.setText("Specified Date");
specifyDateRadio.setMnemonic('F');
specifyDateRadio.setBounds(new Rectangle(108, 96, 100, 22));
specifyDateRadio.setActionCommand("SpecDate");
specifyDateRadio.addActionListener(new DisableRadioAdapter());
centsLabel.setText("\u00a2");
centsLabel.setBounds(new Rectangle(190, 25, 9, 15));
specifyDateField.setBounds(new Rectangle(215, 99, 74, 25));
specifyDateField.setHorizontalAlignment(JTextField.LEFT);
feeStartDateLabel.setText("Start Date");
feeStartDateLabel.setBounds(new Rectangle(32, 65, 54, 15));
feeEnableRadio.setText("Enabled");
feeEnableRadio.setMnemonic('E');
```

```
feeEnableRadio.setToolTipText(" ");
feeEnableRadio.setActionCommand("Enabled");
feeEnableRadio.addActionListener(new DisableRadioAdapter());
feeEnableRadio.setBounds(new Rectangle(347, 19, 91, 22));
disabledRadio.setText("Disabled");
disableRadio.setMnemonic('D');
disableRadio.setActionCommand("Disabled");
disableRadio.addAtionListener(new DisableRadioAdapter());
disableRadio.setBounds(new Rectangle(252, 19, 91, 22));
feeScheduleLabel.setText("Fee Frequency");
feeScheduleLabel.setBounds(new Rectangle(50, 63, 94, 15));
feeBillingLabel.setText("Fee Billing");
feeBillingLabel.setBounds(new Rectangle(179, 22, 68, 15));
specifyDateField.setText("mm/dd/yy");
everyLabel.setText("Every");
feeMonthRadio.setText("Monthly");
feeMonthRadio.addActionListener(new DisableRadioAdapter());
feeSemiRadio.addActionListener(new DisableRadioAdapter());
daysLabel.setText("Days");
feeInfoPanel.setLayout(null);
feeInfoPanel.setBounds(new Rectangle(10,47,309,143))
feeInfoPanel.setBorder(new TitledBorder(new EtchedBorder(),"Fee Infomation"));
feeSchedpanel.setLayout(null);
feeSchedPanel.setBounds(new Rectangle(319,47,288,143));
feeSchedPanel.setBorder(new TitledBorder(new EtchedBorder() ,"Fee Schedule"));
feeTurnOffRadio.setBounds(64,84,150,22);
feeTurnOffRadio.setText("Turn Off Fee Billing");
feeTurnOffRadio.setMnemonic('O');
feeTurnOffRadio.setActionCommand("TurnOff");
retroCheckBox = new JCheckBox("Retroactive From 1st Use");
retroCheckBox.setBounds(64,106,200,22);
feeSchedPanel.add(retroCheckBox, null);
feeSchedPanel.add(feeSemiRadio, null);
feeSchedPanel.add(daysLabel, null);
feeSchedPanel.add(feeMonthRadio, null);
feeSchedPanel.add(feeDaysField, null);
feeSchedpanel.add(everyLabel, null);
feeSchedPanel.add(feeDayIntervalRadio, null);
feeSchedPanel.add(feeTurnOffRadio, null);
feeInfoPanel.add(feeAmtField, null);
feeInfoPanel.add(todayRadio, null);
feeInfoPanel.add(specifyDateRadio, null);
feeInfoPanel.add(feeAmtLabel, null);
feeInfoPanel.add(centeLabel, null);
feeInfoPanel.add(feeStartDateLabel, null);
feeInfoPanel.add(specifyDateField, null);
feePanel.add(feeEnableRadio, null);
feePanel.add(disabledRadio, null);
feePanel.add(feeBillingLabel, null);
feePanel.add(feeSchedPanel, null);
feePanel.add(feeInfoPanel, null);
//feePanel.add(feeScheduleLabel, null);
feePanel.setBorder(new TitledBorder(new Etche&Border(),"Fee Scheduling"));
ButtonGroup feeDisableGroup = new ButtonGroup();
feeDisableGroup.add(feeEnableRadio);
feeDisableGroup.add(disableRadio);
disabledRadio.setSelected(true);
ButtonGroup feeSchedGroup = new ButtonGroup();
feeSchedGroup.add(feeMonthRadio);
feeSchedGroup.add(feeSemiRadio);
feeSchedGroup.add(feeDayIntervalRadio);
feeSchedGroup.add(feeTurnOffRadio);
feeMonthRadio.setSelected(true);
ButtonGroup feeAmtGroup = new ButtonGroup();
feeAmtGroup.add(todayRadio);
feeAmtGroup.add(specifyDateRadio);
pinTabbedPane.addTab("Fee Scheduling",feePanel);
todayRadio.setSelected(true);
todayRadio.setEnabled(false);
specifyDateRadio.setEnabled(false);
feeMonthRadio.setEnabled(false);
feeSemiRadio.setEnabled(false);
feeTurnOffRadio.setEnabled(false);
feeDayIntervalRadio.setRnabled(false);
specifyDateField.setEnabled(false);
feeDaysField.setEnabled(false);
feeAmtField.setEnabled(false);
daysLabel.setEnabled(false);
everyLabel.setEnabled(false);
```

```
        retroCheckBox.setEnabled(false);
        mainPane.add(pinTabbedPane);
        //2,3
        //0,3
        buttonPanel = new JPanel(new FlowLayout());
        buttonPanel.setBounds(0,36S,620,50);
        buttonPanel.setBorder(new EtchedBorder());
        mainPane.add(buttonPanel);
        btnNew = new JButton("New");
        btnNew.addActionListener(new NewAction());
        btnNew.setMnemonic('n');
        buttonPanel.add(btnNew);
        btnSave = new JButton("Save");
        btnSave.setMnenonic('s');
        btnSave.addActionListener(new SaveAction());
        buttonPanel.add(btnSave);
        btnCancel = new JButton("Cancel");
        btnCancel.setMnenonic('c');
        btnCancel.addActionListener(new CancelAction());
        buttonPanel.add(btnCancel);
        //0,4
        statusBar = new StatusBar();
        statusBar.setBounds(0,415,620,25);
        statusBar.setDefaultText("Ready.");
        statusBar.setClickText("Version "getVersionNumber());
        statusBar.setBorder(new EtchedBorder());
        mainpane add(statusBar);
        // batch_numberStartCombo.addMouseListener(this);
        pinTabbedPane.repaint();
        pinTabbedPane.validate();
        addListenerToComponents();
        setUI()
    }
    public void startUp() {
        action = new ActionThread();
        action.start()
    }
    public void getDefaultExecTime() {
        Vector times=new Vector();
        try {
            times = clientInterface.servletInterface.getDefaultExecTimes(username);
        }
        catch(RemoteException re) {
            Systen.out.println("RemoteException");
        }
        catch(ServletException se) {
            Systen.out.println("ServletException");
        }
        if (!times.isEnpty()) }
            if (((String)times.elementAt(0)).length() == 0) {
                executionStartTime=null;
            }
            else {
                executionStartTime = ((String) times.elementAt(0)).trim();
            }
        }
        if (times.size() == 2) {
            if(((String)times.elementAt(1)).length() == 0) {
                executionEndTime=null;
            }
            else {
                executionEndTime = ((String)times.elementAt(1)).trim();
            }
        }
    }
    //***********************************************************************************************
    *******************
    public void shutdown() {
        if (registered) {
            try {
                clientInterface.removeClient();
            }
            catch(ClientException ce) {
                //if (DEBUG) System.out.println("Error while Removing Client");
                //if (DEBUG) System.out.println(ce.getMessage());
                ce.printStackTrace();
            }
        }
    }
```

-continued

```
//****************************************************************************************
********************
    public void loadCustomers() {
        customers = null;
        try {
            customers = clientInterface.servletInterface.getCustomers(username);
        }
        catch(RemoteException re) {
            re.printStackTrace();
        }
        catch(AccessViolationException ave) {
            ave.printStackTrace();
        }
        if (customers.size() == 0) {
            JOptionPane.showMessageDialog(mainPane,"No Customers were found in the database.
Please refer to the Customer Maintenance form to add a new Customer.", "No Customers Found.",
JOptionPane.ERROR_MESSAGE,null);
            if(customer_numberCombo.getItemCount() > 0) {
                customer_numberCombo.removeAllItems();
            }
        }
        customerPane.remove(customer_numberCombo);
        noRender=true;
        customer_numberCombo = new JComboBox(customers);
        customer_numberCombo.setRenderer(new CustoserCellRenderer());
        customer_numberCombo.setBounds(new Rectangle(105, 16, 195, 24));
        customerPane.add(customer_numberCombo);
        customer_numberCombo.addItemListener(new CustomerItemAdapter());
        customer_numberCombo.addFocusListener(new STFocusAdapter());
        customer_numberCombo.repaint();
        customerPane.validate();
        customer_numberCombo.setselectedIndex(0);
        noRender=false;
    }
//****************************************************************************************
********************
//****************************************************************************************
********************
    class CustomerCellRenderer extends JLabel implements ListCellRenderer {
        public CustomerCellRenderer() {
            setOpague(true);
        }
        public Component getListCellRendererComponent(JList list.Object value, int index, boolean
isSelected, boolean cellHasFocus) {
            if (!noRender) {
                if ((((CustomerInfo)value).customerNumber.equals("NULL")) {
                    setText("          ");
                    setBackground(isSelected ? SystemColor.textHighlight :
SystemColor.text);
                    setForeground(isSelected ? SystemColor.textHighlightText :
SystemColor.textText);
                    return this;
                }
                String descrid = ((CustomerInfo)value).customerNumber.toString() +" - " +
((CustomerInfo)value).customerName;
                setText(descrid);
                setBackground(isSelected ? SystemColor.textHighlight : SystemColor.text);
                setForeground(isSelected ? SystemColor.textHighlightText :
SystemColor.textText);
                return this;
            }
            else
                return new JLabel(" ");
        }
    }
//****************************************************************************************
********************
//****************************************************************************************
********************
//****************************************************************************************
********************
    public void loadSubCustomers(String cust_num) throws RemoteException{
        subCustomers = null;
        try {
            subCustomers = clientInterface.servletInterface.getSubCustomers(username,
cust_num);
        }
        catch(RemoteException re) {
            // if we catch a remote exception, rethrow it so it can be caught by doAction,
which will re-register the client and retry the database hit.
```

-continued

```
            throw new RemoteException("Registry reset. Re-register the client.");
        }
        catch(AccessViolationException ave) {
            //statusBar.setStatus("Access Denied.");
            //if (DEBUG) System.out.println("AccessViolationException while getting Sub
Customers");
            //if(DEBUG) System.out.println(ave.getMessage());
            ave.printStackTrace();
        }
        if (subCustomers.size() > 0)
            htSubCustomers = new Hashtable(subCustomers.size() +1, 1.0F);
        else if(subCustomers.size() == 0) {
            JOptionPane.showMessageDialog(mainPane,"No Sub Customers were found in the
database. Please refer to the Sub Customer Maintenance form to add a new Sub Customer.", "No Sub
Customer Found.", JOptionPane.ERROR_MESSAGE,null);
            if (sub_cust_numberCombo.getItemCount() > 0) {
                sub_cust_numberCombo.removeAllItems();
            }
        }
        //sub_cust_numberCombo.removeAllItems();
        for (int i = 0; i < subCustomers.size() ; ++i) }
    htsubCustomers.put(((SubCustomerInfo)subCustomers.elementAt(i)).subCustomerNumber,subCustomers.ele
mentAt(i);
            //    sub_cust_numberCombo.addItem(subCustomers.elementAt(i));
        }
        //combo box revamp,11-3-98
        customerPane.remove(sub_cust_numberCombo);
        sub_cust_numberCombo = new JComboBox(subCustomers);
        //sub_cust_numberCombo.setFont(f);
        sub_cust_numberCombo.setRenderer(new SubCustomerCellRenderer());
        sub_cust_numberCombo.setBounds(new Rectangle(405, 17, 195, 24));
        customerPane.add(sub_cust_numberCombo);
        sub_cust_numberCombo.addFocusListener(new STFocusAdapter());
        sub_cust_numberCombo.repaint();
//      sub_cust_numberCombo.addItemListener(new SubCustomerItemAdapter());
        customerPane.validate();
        subDisabled=false;
    }
//*************************************************************************************
********************
    //*************************************************************************************
********************
    class SubCustonerCellRenderer extends JLabel implements ListCellRenderer {
        public SubCustomerCellRenderer() {
            setopaque(true);
        }
        public Component getListCellRendererComponent(JList list, Object value, int index, boolean
isselected, boolean cellHasFocus) {
            if(value == null) {
                setText("        ");
                setBackground(isSelected ? SystemColor.textHighlight : SyetemColor.text);
                setForeground(isselected ? SystemColor.textHighlightText :
SystemColor.textText);
                return this;
            }
            if(((SubCustomerInfo)value).subCustomerNumber.equals("NULL")) {
                setText("        ");
                setBackground(isSelected ? SystemColor.textHighlight : SystemColor.text);
                setForeground(isSelected ? SystemColor.textHighlightText :
SystemColor.textText);
                return this;
            }
            String descrid = ((SubCustomerInfo)value).subCustomerNumber.toString() + " - " +
((SubCustomerInfo) value).subCustomerName;
            setText(descrid);
            setBackground(isSelected ? SystemColor.textHighlight : SystemColor.text);
            setForeground(isSelected ? SystemColor.textHighlightText : SystemColor.textText);
            return this;
        }
    }
    //*************************************************************************************
********************
    //*************************************************************************************
********************
    class DisableRadioAdapter implements ActionListener {
        public void actionPerfomed(ActionEvent e) {
            feeChange=true;
            if((e.getActionCommand().equals("Enabled")) ||
(e.getActionConnand().equals("Disabled"))) {
```

```
            if (disableRadio.isSelected()) {
                todayRadio.setEnabled(false);
                specifyDateRadio.setEnabled(false);
                feeMonthRadio.setEnabled(false);
                feeSemiRadio.setEnabled(false);
                feeDayIntervalRadio.setEnabled(false);
                specifyDateField.setEnabled(false);
                feeDaysField.setEnabled(false);
                feeAmtField.setEnabled(false);
                daysLabel.setEnabled(false);
                everyLabel.setEnabled(false);
                everyLabel.repaint();
                daysLabel.repaint();
                feeTurnOffRadio.setEnabled(false);
                retroCheckBox.setEnabled(false);
            }
            else {
                todayRadio.setEnabled(true);
                specifyDateRadio.setEnabled(true);
                feeMonthRadio.setEnabled(true);
                feeSemiRadio.setEnabled(true);
                feeDayIntervalRadio.setEnabled(true);
                feeAmtField.setEnabled(true);
                daysLabel.setEnabled(true);
                everyLabel.setEnabled(true);
                feeTurnOffRadio.setEnabled(true);
                retroCheckBox.setEnabled(true);
                everyLabel.repaint();
                daysLabel.repaint();
            }
        }
        if (feeDayIntervalRadio.isSelected() && feeEnabledRadio.isSelected()) {
            feeDaysField.setEnabled(true);
        }
        else {
            feeDaysField.setEnabled(false);
        }
        if(specifyDateRadio.isSelected() && feeEnableRadio.isSelected()) {
            specifyDateField.setEnabled(true);
        }
        else }
            specifyDateField.setEnabled(false);
        }
    }
}
private class ActionThread extends Thread {
    int action = 0;
    public void run() {
        Runnable il = new Runnable() {
            public void run() {
                initForm();
            }
        };
        Thread t = new Thread(il);
        t.start()
        il = new Runnable() {
            public void run() {
                doAction(action);
            }
        };
        Thread thr;
        synchronized(this) {
            while(true) {
                try {
                    this.wait();
                }
                catch(Exception e) {
                    e.printstackTrace();
                }
                thr = new Thread(il);
                thr.start();
            }
        }
    }
    public synchronized void perform(int toDo) {
        action = toDo;
        this.notify();
    }
    private void doAction(int act) {
```

```
            boolean success = false;
            while (!success) {
                try {
                    if (act == LOAD_ALL) {
                        enableComponents(false);
loadAll(((CustomerInfo)customer_numberCombo.getSelectedItem()).customerNumber);
                        success=true;
                        enableComponents(true);
                    }
                    else if (act == LOAD_BATCH) {
                        //LOAD_BATCH:
                        // Disable the form
                        enableComponents(false);
                        loadBatchData();
                        success=true;
                        enableComponents(true);
                    }
                    else if (act == LOAD_SUB_CUST) {
                        // Disable the form
                        enableComponents(false);
loadSubCustomers(((CustomerInfo)customer_numberCombo.getSelectedItem()).customerNumber);
                        success=true;
                        enableComponents(true);
                    }
                    else if (act == SAVE) {
                        saveAction();
                        success=true;
                    }
                }
                catch(RemoteException re) {
                    reRegisterClient();
                }
            }
        }
    }
    private void reRegisterClient() {
        boolean reg = false;
        for(int j=0; j < 5; j++) {
            try {
                clientInterface = null;
                clientInterface = new BatchMastClient();
                clientInterface.servletInterface=null;
                clientInterface.registerClient(ip,supportCallBacks);
                reg=true;
                break;
            }
            catch(ClientException ce) {
                try {
                    Thread.sleep(2000);
                }
                catch(Exception e) {
                }
            }
        }
        if (!reg) {
            JOptionPane.showMessageDialog(this,"Connection to server lost. Please restart the
applet.","Error", JOptionPane.ERROR_MESSAGE);
        }
    }
    public void initForm() {
        enableComponents(false);
        statuaBar.setStatus("Registering Client.",6000000L);
        STPopup pop = new STPopup("PIN/Batch Maintenance","Registering Client",mainPane);
        Thread popup = new Thread(pop);
        popup.start();
        do {
            try {
                clientInterface = new BatchMastClient();
                clientInterface.registerClient(ip, supportCallBacks);
                registered = true;
            }
            catch (Exception ce) {
                ce.printStackTrace();
                System.out.println("Registration failed. Waiting 5 seconds for server
restart.");
                try {
                    Thread.sleep(5000);
                }
                catch (Exception e) {
```

```
                }
            }
        }while (!registered);
        // Setup the pemissions for the for the actions
        setupPermissions();
        if (!canView) {
            pop.disposeOfMe();
            //if not return and leave everything disabled
            statusBar.setStatus("Access Denied",600000000L);
            JOptionPane.showMessageDialog(mainPane,"Access Denied.Contact \nyour System
Administrator","Acces Denied",JOptionPane.ERROR_MESSAGE);
            shutdown();
            return;
        }
        pop.setMessage("Loading Customers . . . ");
        statusBar.setStatus("Loading Customers",6000000L);
        loadCustomers();
        statusBar.setStatus("Loading Statuses", 60000000L);
        pop.setMessage("Loading Statuses . . . ");
        loadStatuses();
        getDefaultExecTime();
        enableComponents(true);
        pop.disposeOfMe();
        statusBar.setStatus("Ready");
    }
//*********************************************************************************
*********************
    //*********************************************************************************
*********************
    public void loadAll(String cust) throws RemoteException {
        setCursor(Cursor.getPredefinedCursor(Cursor.WAIT_CURSOR));
        statusBar.setStatus("Loading Sub Customers",600000000L);
        loadSubCustomers(cust);
        statusBar.setStatus("Loading Retail Plans",6000000000L);
        statusBar.setStatus("Loading Retail Plans",6000000000L);
        loadRatePlans(cust);
        statusBar.setStatus("Loading DNIS Sets",600000000L);
        loadDnisSets(cust);
        statusBar.setStatus("Loading Batch Numbers",600000000L);
        loadBatchNumbers(cust);
        if (sub_cust_numberCombo.getItemCount() == 0) {
            statusBar.setStatus("Loading Sub Customers", 600000000L);
            loadSubCustomers(cust);
        }
        statusBar.setStatus("Ready");
        bia = new BatchItemAdapter();
        batch_numberStartCombo.addItemListener(bia);
        beia = new BatchEndItemAdapter();
        batch_numberEndCombo.addItemListener(beia);
        setCursor(Cursor.getPredefinedCursor(Cursor.DEFAULT_CURSOR));
        clearFields();
    }
//*********************************************************************************
*********************
    public void loadBatchNumbers(String cust_num) throws RemoteException(
        loadBatchData=false;
        //if (DEBUG) System.out.println("Load Batch Numbers Start.Cust ="+cust_num+" User =
"+username);
        batchNumbers = null;
        try {
            if (canAdmin && sub_cust_numberCombo.getItemCount() == 0) {
                batchNumbers = clientInterface.servletInterface.getBatchNumbers(username,
cust_num);
            }
            else {
                batchNumbers = clientInterface.servletInterface.getBatchNumbers(username,
cust_num);
            }
        }
        catch (RemoteException re) {
            throw new RemoteException("Registry reset. Re-register the client.");
        }
        catch(AccessViolationException ave) {
            ave.printStackTrace();
        }
        customerPane.remove(batch_numberStartCombo);
        batch_numberStartCombo = new JComboBox(batchNumbers);
        //batch_numberStartCombo.setFont(f);
        batch_numberStartCombo.setRenderer(new CRenderer());
```

-continued

```
      batch_numberStartCombo.setBounds(new Rectangle(105, 51, 195, 24));
      customerPane.add(batch_numberStartCombo);
      batch_numberStartCombo.repaint();
      customerPane.remove(batch_numberEndCombo);
      batch_numberEndCombo = new JComboBox(batchNumbers);
      //batch_numberEndCombo.setFont(f);
      batch_numberEndCombo.setRenderer(new CRenderer());
      batch_numberEndCombo.setBounds(new Rectangle(405, 51, 195, 24));
      customerPane.add(batch_numberEndCombo);
      batch_numberEndCombo.repaint();
      customerPane.validate();
      STFocusAdapter stf = new STFocusAdapter();
      batch_numberStartCombo.addFocusListener(stf);
      batch_numberEndCombo.addFocusListener(stf);
      batch_numberStartCombo.addItemListener(new BatchItemAdapter());
      batch_numberEndCombo.addItemListener(new BatchEndItemAdapter());
      loadBatchData=true;
  //*********************************************************************************
********************
  //*********************************************************************************
********************
  //*********************************************************************************
********************
      class CRenderer extends JLabel inplements ListCellRenderer {
        public CRenderer() {
          setOpaque(true);
        }
        public Component getListCellRendererComponent(JList list, Object value, int index, boolean
isSelected, boolean cellHasFocus) {
          if (value == null) {
            setText("         ");
            setBackground(isSelected ? SystemColor.textHighlight : SystemColor.text);
            setForeground(isSelected ? SystemColor.textHighlightText :
SystemColor.textText);
            return this;
          }
          if (((BatchInfo)value).batchNumber.toString().equals(new Integer(-1).toString())) {
            setText("         ");
            setBackground(isSelected ? SystemColor.textHighlight : SystemColor.text);
            setForeground(isSelected ? SystemColor.textHighlightText :
SystemColor.textText);
            return this;
          }
          if (((BatchInfo)value).batchNumber.toString().equals(new Integer(-2).toString())) {
            setText(((BatchInfo)value).description);
            setBackground(isSelected ? SystemColor.textHighlight: SystemColor.text);
            setForeground(isSelected ? SystemColor.textHighlightText :
SystemColor.textText);
            return this;
          }
          String descrid = ((BatchInfo)value).batchNumber.toString() + " - " +
((BatchInfo)value).description;
          setText(descrid);
          setBackground(isSelected ? SystemColor.textHighlight : SystemColor.text);
          setForeground(isSelected ? SystemColor.textHighlightText : SystemColor.textText);
          return this;
        }
      }
  //*********************************************************************************
********************
  //*********************************************************************************
********************
  //*********************************************************************************
********************
      public void loadDnisSets(String cust_num) throws RemoteException{
        int dnisSetLength = 0;
        int dnisSetSize = 0;
        int descrLength = 0;
        int descrSize = 0;
        dhisSets = null;
        try {
          dnisSets = clientInterface.servletInterface.getDnisSets(username, cust_num);
        }
        catch(RemoteException re) {
          throw new RemoteException("Registry reset. Re-register the client.");
        }
        catch(AccessViolationException ave) {
          ave.printStackTrace();
        }
```

-continued

```
        if (dnisSets.size() > 0)
            htDnisSets = new Hashtable(dnisSets.size() + 1, 1.0F);
        else {
            JOptionPane.showMessageDialog(mainPane,"No Dnis Sets were found in the database.
Please refer to the Dnis Set Maintenance form to add a new Dnis Set.", "No Dnis Set Found.".
JOptionPane.ERROR_MESSAGE,null);
        }
        if (dnis_setCombo.getItemCount() > 0) {
            dnis_setCombo.removeAllItems();
        }
        String dnisSet = " ";
        String descr = " ";
        for (int i = 0; i < dnisSets.size(); ++i) {
            dnisSetLength = ((DnisSetInfo)dnisSets.elementAt(i)).dnisSet.trim().length();
            if (hnisSetLength > dnisSetSize) {
                dnisSetSize = dnisSetLength;
                dnisSet = ((DnisSetInfo)dhisSets.elementAt(i)).dnisSet.trin();
            }
            if (((DniSSetInfo)dnisSets.elementAt(i)).description != null) {
                descrLength =
((DnisSetInfo)dnisSets.elementAt(i)).description.trim().length();
                if (descrLength > descrSize) {
                    descrSize = descrLength;
                    descr = ((DnisSetInfo)dnisSets.elementAt(i)).description.trim();
                }
            }
        }
        pinPane.remove(dnis_setCombo);
        dnis_setCombo = new JComboBox(dnisSets);
        //dnis_setCombo.setFont(f);
        dnis_setCombo.setRenderer(new Render());
        dnis_setCombo.setBounds(new Rectangle(335, 48, 114, 24));
        pinPane.add(dnis_setCombo);
        dnis_setCombo.addFocusListener(new STFocusAdapter());
        dnis_setCombo.repaint();
        pinPane.validate();
        dnis_setCombo.validate();
    }
//*************************************************************************************
*******************
    //*************************************************************************************
*******************
    //*************************************************************************************
*******************
    claes Render extends JLabel inplements ListCellRenderer {
        public Render() {
            setOpaque(true);
        }
        public Component getListCellRendererComponent(JList list, Object value, int index, boolean
isSelected, boolean cellHasFocus) {
            if (value == null) {
                setText("         ");
                setBackground(isSelected ? SystemColor.textHighlight : SystemColor.text);
                setForeground(isSelected ? SystemColor.textHighlightText :
SystemColor.textText);
                return this;
            }
            if (((DnisSetInfo)value).dnisSet.equals("NULL")) {
                setText("         ");
                setBackground(isSelected ? SystemColor.textHighlight : SystemColor.text);
                setForeground(isSelected ? SystemColor.textHighlightText :
SystemColor.textText);
                return this;
            }
            String descrid = ((DnisSetInfo)value).dnisSet.toString() + " - " +
((DnisSetInfo) value).description;
            setText(descrid);
            setBackground(isSelected ? SystemColor.textHighlight : SystemColor.text);
            setForeground(isSelected ? SystemColor.textHighlightText : SystemColor.textText);
            return this;
        }
    }
//*************************************************************************************
*******************
    //*************************************************************************************
*******************
    //*************************************************************************************
*******************
    public void loadRatePlans(String cust_num) throws RemoteException{
```

```
        int rateLength = 0;
        int rateSize = 0;
        int descrLength = 0;
        int descrSize = 0;
        Vector rates = null;
        try {
            rates = clientInterface.servletInterface.getRetailPlans(username, cust_num);
        }
        catch(RemoteException re) {
            throw new RemoteException("Registry reset. Re-register the client.");
        }
        catch(AccessViolationException ave) {
            ave.printstackTrace();
        }
        if (retail_planCombo.getItemCount() > 0) {
            retail_planCombo.removeAllItems();
        }
        String rate = " ";
        String descr = " ∞;
        for(int i = 0; i < rates.size(); ++i) {
            rateLength = ((RatePlanInfo) rates.elementAt(i)).ratePlan.trim().length();
            if (rateLength > rateSize) {
                rateSize = rateLength;
                rate = ((RatePlanInfo)rates.elementAt(i)).ratePlan.trim();
            }
            if (((RatePlanInfo)rates.elementAt(i)).description != null) {
                descrLength =
((RatePlanInfo)rates.elementAt(i)).description.trim().length();
                if (descrLength > descrSize) {
                    descrSize = descrLength;
                    descr = ((RatePlanInfo) rates.elementAt(i)).description.trim();
                }
            }
        }
        pinPane.remove(retail_planCombo);
        retail_planCombo = new JComboBox(rates);
        //retail_planCombo.setFont(f);
        retail_planCombo.setRenderer(new RatePlanCellRenderer());
        retail_planCombo.setBounds(new Rectangle(335, 15, 114, 24));
        pinPane.add(retail_planCombo);
        retail_planCombo.repaint();
        PinPane.validate();
        retail_planCombo.addFocusListener(new STFocusAdapter());
        retail_planCombo.validate();
    }
    //**********************************************************************
********************
    //**********************************************************************
********************
    //**********************************************************************
********************
    class RatePlanCellRenderer extends JLabel implements ListCellRenderer {
        public RatePlanCellRenderer() {
            setOpaque(true);
        }
        public Component getListCellRendererComponent(JList list, Object value, int index, boolean
        isSelected, boolean cellHasFocus) {
            if (value == null) {
                setText("         ");
                setBackground(isSelected ? SystemColor.textHighlight : SystemColor.text);
                setForeground(isSelected ? SystemColor.textHighlightText :
SystemColor.textText);
                return this;
            }
            if (((RatePlanInfo)value).ratePlan.equals("NULL")) {
                setText("         ");
                setBackground(isSelected ? SystemColor.textHighlight : SystemColor.text);
                setForeground(isSelected ? SystemColor.textHighlightText :
SystemColor.textText);
return this;
            }
            String descrid = ((RatePlanInfo)value).ratePlan.toString() + " - " +
((RatePlanInfo)value).description;
            setText(descrid);
            setBackground(isSelected ? SystemColor.textHighlight : SystemColor.text);
            setForeground(isSelected ? SystemColor.textHighlightText : SystemColor.textText);
            return this;
        }
    }
```

-continued

```
//***********************************************************************************
*********************
    public void loadStatuses() }
       int statusLength = 0;
       int statusSize = 0;
       int descrLength = 0;
       int descrSize = 0;
       Vector status = null;
       try {
          status = clientInterface.servletInterface.getPinStatus(username);
       }
       catch (RemoteException re) {
          re.printStackTrace();
       }
       catch (AccessViolationFxception ave) {
          ave.printStackTrace();
       }
       if (pin_statusCombo.getItemCount() > 0) {
          pin_statusCombo.removeAllItems();
       }
       if (userpin_statusCombo.getItemCount() > 0) {
          userpin_statusCombo.removeAllItems();
       }
       Vector pinsToAdd = new Vector();
       String stat = " ";
       String descr = " ";
       for (int i = 0; i < status.size(); ++i) {
          statusLength = ((PinStatusInfo) status.elementAt(i)).pinStatus.trim().length();
          if (statusLength > statusSize) {
             statusSize = statusLength;
             stat = ((PinStatusInfo)status.elementAt(i)).pinStatus.trim();
          }
          if (((PinStatusInfo)status.elementAt(i)).description != null) {
             descrLength =
((PinStatusInfo)status.elementAt(i)).description.trim().length();
             if (descrLength > descrSize) {
                descrSize = descrLength;
                descr = ((PinStatusInfo)status.elementAt(i)).description.trim();
             }
          }
       }
       for (int i = 0; i > status.size(); ++i) {
          StringBuffer ab = new StringBuffer(((PinStatusInfo)status.elementAt(i)).pinStatus);
          ab.setLength(statusSize);
          PinStatusInfo psi = null;
          if (((PinStatusInfo)status.elementAt(i)).description != null)
             psi = new
PinStatusInfo(ab.toString(),((PinStatusInfo)status.elementAt(i)).description);
          else
             psi = new PinStatusInfo(sb.toString(), "NO DESCRIPTION");
          pinsToAdd.addElement(psi);
       }
       //GridBagConstraints gbc;
       pinPane.remove(pin_statusCombo);
       pin_statusCombo = new JComboBox(pinsToAdd);
       //pin_statusCombo.setFont(f);
       pin_statusCombo.setRenderer(new PINStatusCellRenderer());
       pin_statusCombo.setBounds(new Rectangle(335, 81, 114, 24));
       pinPane.add(pin_statusCombo);
       pin_statusCombo.repaint();
       pinPane.validate();
       STFocusAdapter stf = new STFocusAdapter();
       pin statusCombo.addFocusListener(stf);
       pin_statusCombo.validate();
       userPane.remove(userpin_statusCombo);
       userpin_statusCombo = new JComboBox(pinsToAdd);
       //userpin_statusCombo.setFont(f);
       userpin_statusCombo.setRenderer(new PlNStatusCellRenderer());
       userpin_statusCombo.setBounds(new Rectangle(95, 145, 101, 24));
       userPane.add(userpin_statusCombo);
       userpin_statusCombo.repaint();
       userPane.validate();
       userpin_statusCombo.addFocusListener(stf);
       userpin_statusCombo.validate();
       pin_statusCombo.addItemListener(new PinStatusItemAdapter());
       userpin_statusCombo.addItemListener(new PinStatusItemAdapter());
    }
//***********************************************************************************
*********************
```

-continued

```
//********************************************************************************************
     class PINStatusCellRenderer extends JLabel implements ListCellRenderer {
         public PINStatusCellRenderer() {
             setOpaque(true);
         }
         public Component getListCellRendererComponent(JList list, Object value, int index, boolean
isSelected, boolean cellHasFocus) {
             if (value == null) {
                 setText("          ");
                 setBackground(isSelected ? SystemColor.textHighlight : SystemColor.text);
                 setForeground(isSelected ? SystemColor.textHighlightText :
SystemColor.textText);
                 return this;
             }
             if (((PinStatusInfo)value).pinStatus.equals("!")) {
                 setText("          ");
                 setBackground(isSelected ? SystemColor.textHighlight : SystemColor.text);
                 setForeground(isSelected ? SystemColor.textHighlightText :
SystemColor.textText);
                 return this;
             }
             String descrid = ((PinStatusInfo)value).pinStatus.toString() + " - " +
((PinStatusInfo)value).description;
             setText(descrid);
             setBackground(isSelected ? SystemColor.textHighlight : SystemColor.text);
             setForeground(isSelected ? SystemColor.textHigblightText : SystemColor.textText);
             return this;
         }
     }
//********************************************************************************************
//********************************************************************************************
//********************************************************************************************
     public void loadFields(BatchMastTableData bmtd) {
         if (!canAdmin) {
             if (bmtd.subCustNumber == null)
                 sub_cust_numberCombo.setSelectedIndex(0);
             else
sub_cust_numberCombo.setSelectedItem(htSubCustomers.get(bmtd.subCustNumber));
         }
         sub_cust_numberCombo.repaint();
         descriptionField.setText(bmtd.description);
         if (bmtd.pinsInBatch != null) {
             pins_in_batchField.setText(bmtd.pinsInBatch.toString());
         }
         SimpleDateFormat sdf = new SimpleDateFormat(dateFormat);
         if (bmtd.creationDate == null) {
             creation_dateField.setText(" ");
         }
         else {
             creation_dateField.setText(sdf.format(bmtd.creationDate));
         }
         if (bmtd.batchExpirationDate == null)
             expiration_dateField.setText(" ");
         else
             expiration_dateField.setText(sdf.format(bmtd.batchExpirationDate));
         max_recharge_amtField.setText(formatCurrencyValue(bmtd.maxRechargeAmount.doubleValue() /
100));
         max_recharge_ttlFieeld.setText(formatCurrencyValue(bmtd.maxRechargeTotal.doubleValue() /
100));
         max_renewalsField.setText(bmtd.maxRenewals.toString());
         user_who_addedField.setText(bmtd.userWhoAdded);
         if (bmtd.whenAdded = null) {
             when_addedField.setText(" ");
         }
         else {
             when_addedField.setText(sdf.format(bmtd.whenAdded));
         }
         if (bmtd.userWhoChanged != null)
             user_who_changedField.setText(bmtd.userWhoChanged);
         if (bmtd.whenChanged != null)
             when_changedField.setText(sdf.format(bmtd.whenChanged));
         fromField.setText(" ");
         toField.setText(" ");
```

```
        allRadio.setSelected(true);
        original_balanceField.setText(" ");
        retail_planCombo.setSelectedIndex(0);
        amount_usedField.setText(" ");
        amount_remainingField.setText(" ");
        post_pin_brandingField.setText(" ");
        dnis_setCombo.setSelectedIndex(0);
        activation_dateField.setText(" ");
        pin_statusCombo.setSelectedIndex(0);
        userpin_statusCombo.setSelectedIndex(0);
        init_exp_daysField.setText(" ");
        last_exp_daysField.setText(" ");
    }
//**********************************************************************************
********************
    //**********************************************************************************
********************
    class CustomerItemAdapter implements ItemListener {
        pubiic void itemStateChanged(ItemEvent ie) {
            if (ie.getStateChange() == ItemEvent.DESELECTED)
                return;
            loadBatchData=false;
            clearFields();
            if (sub_cust_numberCombo.getItemCount() > 0) {
                sub_cust_numberCombo.removeAllItems();
            }
            sub_cust_numberCombo.repaint();
            if (batch_numberStartCombo.getItemCount() > 0) {
                batch_numberStartCombo.removeAllItems();
            }
            batch_numberStartCombo.repaint();
            if (batch_numberEndCombo.getItemCount() > 0) {
                batch_numberEndCombo.removeAllItems();
            }
            batch_numberEndCombo.repaint();
            if (retail_planCombo.getItemCount() > 0) {
                retail_planCombo.removeAllItems();
            }
            retail_planCombo.repaint();
            if (dnis_setCombo.getItemCount() > 0) {
                dnis_setCombo.removeAllItems();
            }
            dnis_setCombo.repaint();
            btnSave.setEnabled(false);
            btnNew setEnabled(false);
            btnCancel.setEnabled(false);
            if (canAdmin) {
                subDisabled=true;
                action.perform(LOAD_ALL);
                specifyDateField.setText("mm/dd/yy");
                feeDaysField.setText(" ");
                feeAmtField.setText(" ");
                enableComponents(true);
            }
            else if (customer_numberCombo.getSelectedIndex() != 0) {
                CustomerInfo custinfo =
(CustomerInfo)customer_numberCombo.getSelectedItem();
                String cust = custinfo.customerNumber;
                specifyDateField.setText("mm/dd/yy");
                feeDaysField.setText(" ");
                feeAmtField.setText(" ");
                action.perform(LOAD_ALL);
                enableComponents(true);
            }
            loadBatchData=true;
        }
    }
//**********************************************************************************
********************
    //**********************************************************************************
********************
    class BatchItemAdapter implenents ItemListener {
        public void itemStateChanged(ItemEvent ie) {
            if (loadBatchData) {
                if (ie.getStateChange() == ItemEvent.SELECTED) {
                    disableRadio.doClick();
                    if (batch_numberStartCombo.getSelectedIndex() == 0) {
                        if (batch_numberEndCombo.getItemCount() > 0) {
                            batch_numberEndCombo.setSelectedIndex(0);
```

```
                    }
                    batch_numberEndCombo.setEnabled(false);
                    clearFields();
                    return;
                }
                else {
                    if ((BatchInfo)batch_numberStartCombo.getSelectedItem() ==
null)
                        return;
                    isStartBatch=true;
                    action.perfom(LOAD_BATCH);
                    origSubCust =
((SubCustomerInfo)sub_cust_numberCombo.getSelectedItem()).subCustomerNumber.trim();
                }
                specifyDateField.setText("mm/dd/yy");
                feeDaysField.setText(" ");
                feeAmtField.setText(" ");
            }
        }
    }
}
//*********************************************************************************************
*********************
//*********************************************************************************************
*********************
    class BatchEndItemAdapter implements ItemListener {
        public void itemStateChanged(ItemEvent ie) {
            if (loadBatchData) {
                if (ie.getStateChange() == ItemEvent.SELECTED) {
                    if ((BatchInfo)batch_numberEndCombo.getSelectedItem() == null)
                        return;
                    disableRadio.doClick();
                    if (batch_numberEndCombo.getSelectedIndex() == 0) {
                        fromRadio.setEnabled(true);
                        toField.setEnabled(true);
                        fromField.setEnabled(true);
                        if (batch_numberStartCombo.getSelectedIndex() != 0) {
                            isStartBatch=false;
                            action.perform(LOAD_BATCH);
                        }
                    }
                    else }
                        String selText =
((BatchInfo)batch_numberEndCombo.getSelectedItem()).toString();
                        int batchEnd =
((BatchInfo)batch_numberEndCombo.getSelectedItem()).batchNumber.intValue();
                        if (batch_numberStartCombo.getSelectedItem() == null) {
                            for (int j=1; j >
batch_numberStartCombo.getItemCount(); j++) {
                                if
(((BatchInfo)batch_numberStartCombo.getItemAt(j)).batchNumber.intValue() == batchEnd) {
    batch_numberStartCombo.setSelectedIndex(j);
                                    return;
                                }
                            }
                        }
                        int batchStart =
((BatchInfo)batch_numberStartCombo.getSelectedItem()).batchNumber.intValue();
                        // end if endbatch == 0
                        if (batchStart < batchEnd) {
                            clearFields();
                            allRadio.setSelected(true);
                            fromRadio.setEnabled(false);
                            toField.setEnabled(false);
                            fromField.setEnabled(false);
                        }
                        else if (batchStart == batchEnd) {
                            if (batch_numberEndCombo.getItemCount() > 0)
                                batch_numberEndCombo.setSelectedIndex(0);
                            return;
                        }
                        else if (batchstart > batchEnd) {
                            if (batch_numberEndCombo.getItemCount() > 0)
                                batch_numberEndCombo.setSelectedIndex(0);
                            return;
                        }
                        clearFields()
                        origSubCust =
((SubCustomerInfo) sub_cust_numberCombo.getSelectedItem()).subCustomerNumber.trim();
                    }
```

-continued

```
                }
            }
        }
    }
    class pinStatusItemAdapter implements ItemListener {
        public void itemStateChanged(ItemEvent ie) {
            if (ie.getStateChange() == ItemEvent.SELECTED) {
                if (ie.getSource().equals(pin__statusCombo)) {
                    if
(pin__statusCombo.getSelectedItem().equals(userpin__statusCombo.getSelectedItem())) {
                        return;
                    }
                    else {
                userpin__statusCombo.setSelectedItem(pin__statusCombo.getSelectedItem());
                    }
                }
                else {
                    if
(userpin__statusCombo.getSelectedItem().equals(pin__statusCombo.getSelectedItem())) {
                        return;
                    }
                    else {
                pin__statusCombo.setSelectedItem(userpin__statusCombo.getSelectedItem());
                    }
                }
            }
        }
    }
    public void loadBatchData() throws RemoteException{
        BatchMastTableData bmtd = new BatchMastTableData();
        if ((((BatchInfo)batch__numberStartCombo.getSelectedItem()).batchNumber.intValue() < 0)
            return;
        try {
            bmtd =
clientInterface.servletInterface.viewBatchMast(username,((CustomerInfo)customer__numberCombo.getSelectedIt
em()).customerNumber,((BatchInfo)batch__numberStartCombo.getSelectedItem()).batchNumber.intValue());
        }
        catch(AccessViolationException ave) {
            //statusBar.setStatus("Access Denied.");
            //if (DEBUG) System.out.println("AccessViolationException while Viewing
batch__mast");
            //if (DEBUG) System.out.println(ave.getMessage());
            ave.printStackTrace();
        }
        catch (ServletException se) {
            //statusBar.setStatus("Server Error.");
            //if (DEBUG) System.out.println("ServletException while Viewing batch__mast");
            //if (DEBUG) System.out.println(se.getMessage());
            se.printStackTrace();
        }
        catch(RemoteException re) {
            // if we catch a remote exception, rethrow it so it can be caught by doAction,
which will re-register the client and retry the database hit.
            throw new RemoteException("Registry reset. Re-register the client.");
        }
        if (isStartBatch) {
            batch__numberEndCombo.setSelectedIndex(0);
            batch__numberEndCombo.setEnabled(true);
        }
        loadFields(bmtd);
    }
    classNewAction implements ActionListener {
        public void actionPerformed(ActionEvent ae) {
            batch__numberEndCombo.setEnabled(false);
            batch__numberEndCombo.repaint();
            btnNew.setEnabled(false);
            batch__numberStartCombo.setSelectedIndex(0);
            batch__numberStartCombo.setEnabled(false);
            batch__numberEndCombo.setEnabled(false);
            customer__numberCombo.setEnabled(false);
            descriptionField.setEnabled(true);
            pins__in__batchField.setEnabled(true);
            state = BatchMast.NEW;
            clearFields();
            fromRadio.setEnabled(false);
            fromField.setEnabled(false);
            toField.setEnabled(false);
            descriptionField.requestFocus();
        }
```

-continued

```
    }
//********************************************************************************************
*********************
    //********************************************************************************************
*********************
    //********************************************************************************************
*********************
    public void clearFields() {
        if (sub_cust_numberCombo.getItemCount() > 0)
            sub_cust_numberCombo.setSelectedIndex(0);
        sub_cust_numberCombo.repaint();
        descriptionField.setText(" ");
        pins_in_batchField.setText(" ");
        if (state == BatchMast.MODIFY) {
            descriptionField.setEditable(false);
            pins_in_batchField.setEditable(false);
            batchPadCombo.setEnabled(false);
            seqPadCombo.setEnabled(false);
        }
        else if (state == BatchMast.NEW) {
            descriptionField.setEditable(true);
            pins_in_batchField.setEditable(true);
            batchPadCombo.setEnabled(true);
            seqPadCombo.setEnabled(true);
        }
        descriptionField.repaint();
        pins_in_batchField.repaint();
        max_recharge_amtField.setText(" ");
        max_recharge_ttlField.setText(" ");
        creation_dateField.setText(" ");
        expiration_dateField.setText("mm/dd/yy");
        max_renewalsField.setText(" ");
        allRadio.setSelected(true);
        fromField.setText(" ");
        toField.setText(" ");
        user_who_addedField.setText(" ");
        when_addedField.setText(" ");
        user_who_changedField.setText(" ");
        when_changedField.setText(" ");
        original_balanceField.setText(" ");
        amount_usedField.setText(" ");
        amount_remainingField.setText(" ");
        activation_dateField.setText("mm/dd/yy");
        post_in_brandingField.setText(" ");
        init_exp_daysField.setText(" ");
        last_exp_daysField.setText(" ");
        specifyDateField.setText("mm/dd/yy");
        feeDaysField.setText(" ");
        feeAmtField.setText(" ");
        batchPadCombo.setSelectedItem(blankstring);
        seq(PadCombo.setSelectedItem(blankString);
        if (retail_planCombo.getItemCount() > 0)
            retail_planCombo.setSelectedIndex(0);
        if (dnis_setCombo.getItemCount() > 0)
            dnis_setCombo.setSelectedIndex(0);
        if (pin_statusCombo.getItemCount() > 0)
            pin_statusCombo.setSelectedIndex(0);
        if (userpin_statusCombo.getItemCount() > 0)
            userpin_statusCombo.setSelectedIndex(0);
        disabledRadio.setSelected(true);
        retroCheckBox.setSelected(false);
    }
//********************************************************************************************
*********************
    private void saveAction() throws RemoteException(
        // Disable the form during the save
        boolean saved=false;
        enableComponents(false);
        BatchMastTableData bmtd = grabFields();
        if (bmtd == null) {
            enableComponents(true);
            return;
        JComponent component = batch_numberStartCombo;
        boolean quit = false;
        if (state == BatchMast.MODIFY) {
            if (bmtd.batchNumber == null) {
                component = batch_numberStartCombo;
                JOptionPane.showMessageDialog(mainPane,"A batch number must be
entered.","No Batch Number specified.",JOptionPane.ERROR_MESSAGE);
```

```
                batch_numberStartCombo.requestFocus();
                quit = true;
            }
            if ((bmtd.startseqNumber != null) &&
                (bmtd.endseqNumber != null)) {
                if ((bmtd.startSeqNumber.intValue() > bmtd.endSeqNumber.intValue()) ||
                    (bmtd.startSeqNumber.intValue() < 0) ||
                    (bmtd.endseqNumber.intValue() < 0)) {
                    JOptionPane.showMessageDialog(mainPane,"Invalid PIN Range.","Invalid
PIN Range.",JOptionPane.ERROR_MESSAGE);
                    fromField.requestFocus();
                    quit = true;
                }
            }
            if (bmtd.amountRemaining != null) {
                int intResult = JOptionPane.showConfirmDialog(mainPane,
                    "WARNING: Setting the Anount Remaining \n will 'recharge' all PINs
in the range \n to the specified value, including any PINs \n that may have already been used.","Are You
Sure?",
                    JOptionPane.YES_NO_OPTION, JOptionPane.WARNING_MESSAGE);
                if (intResult == JOptionPane.NO_OPTION) {
                    quit = true;
                }
            }
            if (quit) {
                component.requestFocus();
                enableComponents(true);
                statusBar.setStatus("Ready");
                return;
            }
        }
        else if (state == BatchMast.NEW) {
            if (bmtd.subCustNumber == null) {
                JOptionPane.showMessageDialog(mainPane,"A Sub Customer is required.","No
Sub Customer specified.",JOptionPane.ERROR_MESSAGE);
                sub_cust_numberCombo.requestFocus();
                component = sub_cust_numberCombo;
                quit = true;
            }
            else if (bmtd.description == null) {
                JOptionPane.showMessageDialog(mainPane,"A description must be entered.","No
Description specified.",JOptionPane.ERROR_MESSAGE);
                descriptionField.requestFocus();
                component = descriptionField;
                quit = true;
            }
            else if (bmtd.pinsInBatch == null) {
                JOptionPane.showMessageDialog(mainPane,"The number of PINs in the Batch
must be entered.","Total PINs in satch not specified.",JOptionPane.ERROR_MESSAGE);
                pins_in_batchField.requestFocus();
                component = pins_pins_batchField;
                quit = true;
            }
            else if (buitd.dnisSet == null) {
                JOptionPane.showMessageDialog(mainPane,"A DNIS Set must be selected.","No
DNIS Set specified.",JOptionPane.ERROR_MESSAGE);
                dnis_setCombo.requestFocus();
                component = dnis_setCombo;
                quit = true;
            }
            else if (bmtd.pinStatus == null) {
                JOptionPane.showMessageDialog(mainPane,"A Status must be selected.","No PIN
Status specified.",JOptionPane.ERROR_MESSAGE);
                pin_statusCombo.requestFocus();
                component = pin_statusCombo;
                quit = true;
            }
            else if (!bmtd.pinStatus.equalsIgnoreCase("I"))) {
                if (bmtd.originalBalance == null) {
                    JOptionPane.showMessageDialog(mainPane,"An Original Balance must be
entered.","NO Original Balance specified.",JOptionPane.ERROR_MESSAGE);
                    original_balanceField.requestFocus();
                    component = original_balanceField;
                    quit = true;
                }
                else if (bmtd.retailplan == null) {
                    JOptionPane.showMessageDialog(mainPane,"A Retail Plan must be
selected."."No Retail Plan specified.",JOptionPane.ERROR_MESSAGE);
                    retail_planCombo.requestFocus();
```

```
            component = retail_planCombo;
            quit = true;
         }
      }
      if (quit) {
         component.requestFocus();
         enableComponents(true);
         statusBar.setStatus("Ready");
         return;
      }
   }
   int intResult =
JOptionPane.showConfirmDialog(mainPane,getConfirmationData(bmtd).toString(),"Please
Review",JOptionPane.YES_NO_OPTION, JOptionPane.WARNING_MESSAGE);
      if (intResult != JOptionPane.YES_OPTION) {
         enableComponents(true);
         return;
      }
      if (state == BatchMast.NEW)
         statusBar.setStatus("Scheduling PIN Creations",6000000L);
      if (state == BatchMast.MODIFY)
         statusBar.setStatus("Scheduling Modifications",6000000L);
      Object [] options = { "Schedule Normally", "Custom Schedule", "Run Immediately");
      String scheduleString = (String)JOptionPane.showInputDialog(mainPane,
                        "Batch Scheduling     ",
                        "Scheduling Method",
                        JOptionPane.OK_CANCEL_OPTION,
                        null,
                        options,
                        "Schedule Normally");
      if (schedulestring == null) {
         statusBar.setStatus("Ready");
         enableComponents(true);
         return;
      }
      Calendar exCal = Calendar.getInstance();
      if (executionStartTime != null) {
         int hour = (new
Integer(executionStartTime.substring(0,executionStartTime.lastIndexOf(":")))).intValue();
         int minutes = (new
Integer(executionStartTime.substring(executionStartTime.lastIndexOf(":")+1))).intValue();
         exCal.set(Calendar.MINUTE,minutes);
         exCal.set(Calendar.HOUR_OF_DAY,hour);
      }
      else {
         exCal.add(Calendar.DATE, 1);
         exCal.set(Calendar.HOUR_OF_DAY, 6);
         exCal.set(Calendar.MINUTE,0);
      }
      String amString = (exCal.get(Calendar.AM_PM) ? "PM" : "AM";
      String min;
      if (exCal.get(Calendar.MINUTE) < 10) {
         min="0"+excal.get(Calendar.MINUTE);
      }
      else {
         min=" "+exCal.get(Calendar.MINUTE);
      }
      String sExDate = exCal.get(Calendar.HOUR)+":"+min+" "+amString +" "+
                        (exCal.get(Calendar.MONTH)+1)+"/"+
                        exCal.get(Calendar.DATE)+"/"+
                        (exCal.get(Calendar.YEAR)-1900);
      String endExDate=null;
      Calendar exEndCal = Calendar.getInstance();
      SimpleDateFormat formatter = new SimpleDateFomat();
      formatter.getDateTimeInstance();
      fomatter.applyPattern("K':'m a M/d/y");
      if (executionEndTime != null) {
         int hour = (new
Integer(executionEndTime.substring(0,executionEndTime.lastIndexOf(":")))).intValue();
         int minutes = (new
Integer(executionEndTime.substring(executionEndTime.lastIndexOf(":")+1))).intValue();
         exEndCal.set(Calendar.MINUTE, minutes);
         exEndCal.set(Calendar.HOUR_OF_DAY,hour);
         String min1;
         if (exEndCal.get(Calendar.MINUTE) < 10) {
            min1="0"+exEndCal.get(Calendar.MINUTE);
         }
         else {
            min1=" "+exEndCal.get(Calendar.MINUTE);
```

```
            }
            String amEndString = (exEndCal.get(Calendar.AM_PM) ? "PM" : "AM";
            endExDate = exEndCal.get(Calendar.HOUR)+":"+minI+" "+amEndString +" "+
                        (exEndCal.get(Calendar.MONTH)+1)+"/"+
                        exEndCal.get(Calendar.DATE)+"/"+
                        (exEndCal.get(Calendar.YEAR)-1900);
        }
        String dateString = null;
        String endString = null;
        if (scheduleString.equals("Schedule Normally")) {
            dateString = sExDate;
            endString = endExDate;
        }
        else if (scheduleString.equals("Custom Schedule")) {
            dateString = (String)JOptionPane.showInputDialog(mainPane,
                    "Batch Schedule Time & Date     ",
                    "Date & Time",
                    JOptionPane.OK_CANCEL_OPTION,
                    null,
                    null,
                    sExDate);
            if (dateString == null) {
                statusBar.setStatus("Ready");
                enableComponents(true);
                return;
            }
        }
        else if (scheduleString.equals("Run Immediately")) {
            intResult = JOptionPane.showConfirmDialog(mainPane,
                "Are you sure you want to run this transacton now?\n"+
                "This could seriously degrade server performance!","Are you sure?",
                JOptionPane.YES_NO_OPTION, JOptionPane.WARNING_MESSAGE);
            if (intResult == JOptionPane.YES_OPTION) {
                bmtd.runImmediatelyFlag=true;
                Calendar nowCal = Calendar.getInstance();
                amString = (nowCal.get(Calendar.AM_PM) > 0) ? "PM" : "AM";
                dateString = nowCal.get(Calendar.HOUR)+":"+nowCal.get(Calendar.MINUTE)+"
"+amString +" "+
                        (nowCal.get(Calendar.MONTH)+1)+"/"+
                        nowCal.get(Calendar.DATE)+"/"+
                        (nowCal.get(Calendar.YEAR)-1900);
            }
            else {
                statusBar.setStatus("Ready");
                enableComponents(true);
                return;
            }
        }
        // Check the input against the expected format
        if (dateString != null) {
            bmtd.pinCreationDate = formatter.parse(dateString, new ParsePosition(0));
        }
        if (bmtd.pinCreationDate == null) {
            JOptionPane.showMessageDialog(mainPane,"Invalid date format.\nPlease re-save and
use 'Hour AM-PM mm/dd/yy' \nie. '8 AM 12/31/98'.","Invalid Date.", JOptionPane.ERROR_MESSAGE);
            enableComponents(true);
            statusBar.setStatus("Ready");
            return;
        }
        if (endString != null) {
            bmtd.executionEndDate = formatter.parse(endString, new ParsePosition(0));
        }
        if (bmtd == null) {
            enableComponents(true);
            statusBar.setStatus("Ready");
            return;
        }
        intResult = JOptionPane.showConfirmDialog(mainPane,"Are you sure you want to save this
record? This action cannot be undone!","Are you
sure?",JOptionPane.YES_NO_OPTION,JOptionPane.WARNING_MESSAGE);
        if (intResult == JOptionPane.YES_OPTION) {
            STPopup pop = new STPopup("Pin/Batch Maintenance","Scheduling transaction, please
wait . . .",mainPane);
            pop.pack();
            statusBar.setStatus("Scheduling transaction . . . ",6000000L);
            try {
                if (state == BatchMast.MODIFY) {
                    intResult =
clientInterface.servletInterface.modifyBatchMast(username,bmtd);
```

```
            saved=true;
            pop.disposeOfMe();
         }
         else if (state == BatchMast.NEW) {
            intResult =
clientInterface.servletInterface.addBatchMast(username,bmtd);
            // Get rid of the popup message
            saved=true;
            pop.disposeofMe();
         }
      }
      catch (AccessViolationException ave) {
         enableComponents(true);
         pop.disposeOfMe();
         statusBar.setStatus("Access Denied.",600000000L);
         String message = "Unable to save data. Contact the System
Adminitrator.\n\n"+ave.getMessage();
         JOptionPane.showMessageDialog(mainPane,
   message,
   "Save Error.",JOptionPane.ERROR_MESSAGE);
         enableComponents(true);
         ave.printStackTrace();
      }
      catch(ServletException se) {
         enableComponents(true);
         pop.disposeofMe();
         String message = "Unable to save data.Contact the System
Adminitrator.\n\n"+se.getMessage();
         JOptionPane.showMessageDialog(mainPane,
   message,
   "Save Error.",JOptionPane.ERROR MESSAGE);
         statusBar.setStatus("Server Error.",600000000L);
         //if (DEBUG) System.out.println("ServletException while saving
batch mast:"+intResult);
         //if (DEBUG) System.out.println(se.getMessage());
         se.printStackTrace();
      }
      catch (RemoteException re) {
         throw new RemoteException("Registry reset. Re-register the client.");
      }
      finally {
         if (state == BatchMast.MODIFY) {
            if (intResult > 0) {
               JOptionPane.showMessageDialcg(mainPane,
      "Record scheduled for update. Pins will be modified after "+
      dateString,
      "Record Saved.",JOptionPane.INFORMATION_MESSAGE);
            }
            else }
               statusBar.setStatus("Record NOT added.",600000000L);
            }
         }
         else if (state == BatchMast.NEW) {
            if (intResult > 0) {
               JOptionPane.showMessageDialog(mainPane,
      "Batch #"+intResult+" added. Pins will be available after "+
      dateString,
      "Record Added.",JOptionPane.INFORMATION_MESSAGE);
               CustomerInfo custinfo =
(CustomerInfo)customer_numberCombo.getSelectedItem();
               String cust = custinfo.customerNumber;
               statusBar.setStatus("Loading batch numbers",600000000L);
               loadBatchNumbers(cust);
               clearFields();
            }
            else {
               statusBar.setStatus("Record NOT added.",600000000L);
            }
         }
         if (saved) { // if saving failed, don't reset the state.
            state = BatchMast.MODIFY;
         }
         enableComponents(true);
         statusBar.setStatus("Ready");
         repaint();
      }
   }// end if (response == YES)
   else {
      enableComponents(true);
```

-continued

```
            statusBar.setStatus("Ready");
            repaint();
         } // end else
      }
//*****************************************************************************************
//*****************************************************************************************
      class SaveAction implements ActionListener {
         public void actionPerformed(ActionEvent ae) {
            action.perform(SAVE);
         }// end actionPerformed method
      }
      public final StringBuffer getConfirmatioData(BatchMastTableData bmtd) {
         StringBuffer msg = new StringBuffer();
         SimpleDateFormat sdf = new SimpleDateFormat(dateFormat);
         String space = "      ";
         msg.append("Customer");
         msg.append(":");
         msg.append(space);
         msg.append(bmtd.customerNumber);
         nsg.append("\n");
         if (bmtd.subCustNumber != null) {
            msg.append("Sub Customer");
            msg.append(":");
            msg.append(space);
            msg.append(bmtd.subCustNumber);
            msg.append("\n");
         }
         if (bmtd.startBatchNumber != null) {
            msg.append("Start Batch Number");
            msg.append(":");
            msg.append(space);
            msg.append(bmtd.startBatchNumber);
            msg.append("\n");
         }
         if (bmtd.endBatchNumber != null) {
            msg.append("End Batch Number");
            msg.append(:");
            msg.append(space);
            msg.append(bmtd.endBatchNumber);
            msg.append("\n");
         }
         if (bmtd.pinsInBatch != null) {
            msg.append("PINs in Batch");
            msg.append(":");
            msg.append(space);
            msg.append(bmtd.pinsInBatch);
            msg.append("\n");
         }
         if (bmtd.pinStatus != null) {
            msg.append("PIN Status");
            msg.append(":");
            msg.append(space);
            msg.append(bmtd.pinStatus);
            msg.append("\n");
         }
         if (bmtd.retailPlan != null) {
            msg.append("Retail Plan Name");
            msg.append(":");
            msg.append(space);
            msg.append(bmtd.retailPlan);
            msg.append("\n");
         }
         if (bmtd.dnisSet != null) {
            msg.append("Dnis Set");
            msg.append(":");
            msg.append(space);
            msg.append(bmtd.dnisSet);
            msg.append("\n");
         }
         if (bmtd.batchExpirationDate != null) {
            msg.append("Expiration Date");
            msg.append(":");
            msg.append(space);
            msg.append(sdf.format(bmtd.batchExpirationDate));
            msg.append("\n");
         }
         if (bmtd.hit_date != null) {
```

```
      msg.append("Fee Start Date");
      msg.append(":");
      msg.append(space);
      msg.append(sdf.format(bmtd.hit_date));
      msg.append("\n");
   }
   if (bmtd.hit_period != null) {
      msg.append("Fee Period");
      msg.append(":");
      msg.append(space);
      if (bmtd.hit_period.intValue() == 0) {
         msg.append("Disable Fee Billing");
      }
      else if (bmtd.hit_period.intValue() == -1) {
         msg.append("Monthly");
      }
      else if (bmtd.hit_period.intValue() == -2) {
         msg.append("Semi-monthly");
      }
      else if (bmtd.hit_period.intValue() == -3) {
         msg.append("Monthly");
         msg.append(" - ");
         msg.append("Retroactive from 1st use");
      }
      else if (bmtd.hit_period.intValue() == -4) {
         msg.append("Semi-monthly");
         msg.append(" - ");
         msg.append("Retroactive from 1st use");
      }
      else if (bmtd.hit_period.intValue() > 6) {
         msg.append("Every");
         msg.append(" ");
         msg.append(bmtd.hit_period);
         msg.append(" ");
         msg.append("Days");
      }
      else if (bmtd.hit_period.intValue() < -6) {
         msg.append("Every");
         msg.append(" ");
         msg.append(bmtd.hit_period intValue()*-1);
         msg.append(" ");
         msg.append("Days");
         msg.append(" - ");
         msg.append("Retroactive from 1st use");
      }
      msg.append("\n");
   }
   if (bmtd.hit_charge != null) {
      msg.append("Fee Amount");
      msg.append(":");
      msg.append(space);
      msg.append(bmtd.hit_charge);
      msg.append("\n");
   }
   if (bmtd.maxRechargeAmount != null) {
      msg.append("Max Recharge Amount");
      msg.append(":");
      msg.append(space);
      msg.append(bmtd.maxRechargeAmount);
      msg.append("\n");
   }
   if (bmtd.maxRechargeTotal != null) {
      msg.append("Max Recharge Total");
      msg.append(":");
      msg.append(space);
      msg.append(bmtd.maxRechargeTotal);
      msg.append("\n");
   }
   if (bmtd.maxRenewals != null) {
      msg.append("Max Renewals");
      msg.append(":");
      msg.append(space);
      msg.append(bmtd.maxRenewals);
      msg.append("\n");
   }
   if (bmtd.batchPad != null) {
      msg.append("Batch Length");
      msg.append(":");
      msg.append(space);
```

```
    msg.append(bmtd.batchPad);
    msg.append("\n");
}
if (bmtd.seqPad != null) {
    msg.append("sequence Length");
    msg.append(":");
    msg.append(space);
    msg.append(bmtd.seqPad);
    msg.append("\n");
}
if (bmtd.startSeqNumber != null) {
    msg.append("Starting Sequence");
    msg.append(":");
    msg.append(space);
    msg.append(bmtd.startSeqNumber);
    msg.append("\n");
}
if (bmtd.endSeqNumber != null) {
    msg.append("Ending Sequence");
    msg.append(":");
    msg.append(space);
    msg.append(bmtd.endSeqNumber);
    msg.append("\n");
}
if (bmtd.originalBalance != null) {
    msg.append("original PIN Balance");
    msg.append(":");
    msg.append(space);
    msg.append(bmtd.originalBalance);
    msg.append("\n");
}
if (bmtd.amountRemaining != null) {
    msg.append("Amount Remaining");
    msg.append(":");
    msg.append(space);
    msg.append(bmtd.amountRemaining);
    msg.append("\n");
}
if (bmtd.amountUsed != null) {
    msg.append("Amount Used");
    msg.append(":");
    msg.append(space);
    msg.append(bmtd.amountUsed);
    msg.append("\n");
}
if (bmtd.lastExpDays != null) {
    msg.append("Days From Last Use");
    msg.append(":");
    msg.append(space);
    msg.append(bmtd.lastExpDays);
    msg.append("\n");
}
if (bmtd.initExpDays != null) {
    msg.append("Days From Initial Use");
    msg.append(":");
    msg.append(space);
    msg.append(bmtd.initExpDays);
    msg.append("\n");
}
if (bmtd.activationDate != null) {
    msg.append("Date PINs Become Active");
    msg.append(":");
    msg append(space);
    msg.append(sdf.format(bmtd.activationDate));
    msg.append("\n");
}
if (bmtd.post_pin_branding != null) {
    msg.append("Post PIN Branding");
    msg.append(":");
    msg.append(space);
    msg.append(bmtd post_pin_branding);
    msg.append("\n");
}
    msg.append("\n\n");
    nsg.append("Click Yes to accept these changes.");
    return msg;
}
public BatchMastTableData grabFields() {
    BatchMastTableData bmtd = new BatchMastTableData();
```

-continued

```
            bmtd.customerNumber =
((CustomerInfo)customer__numberCombo.getSelectedItem()).customerNumber;
        if (sub__cust__numberCombo.getSelectedIndex() > 0)
            bmtd.subCustNumber =
((SubCustomerInfo)sub__cust__numberCombo.getSelectedItem()).subCustomerNumber;
        else
            bmtd.subCustNumber = null;
        if (batch__numberStartCombo.getSelectedIndex() > 0)
            bmtd.batchNumber =
((BatchInfo)batch__numberStartCombo.getSelectedItem()).batchNumber;
        else
            bmtd.batchNunber = null;
        if (descriptionField.getText().trim().equals(" ");
            bmtd.description = null;
        else
            bmtd.description = descriptionField.getText();
        if (pins__in__batchField.getText().trim().equals(" "))
            bmtd.pinsInBatch = null;
        else {
            try {
                bmtd.pinsInBatch = new Integer(pins__in__batchField.getText());
            }
            catch(NumberFormatException nfe) {
                JOptionPane.showMessageDialog(mainPane,"Please re-enter the number of
PINs\n(whole numbers only).","Invalid Number of PINS.",JOptionPane.ERROR__MESSAGE);
                pins__in__batchField.requestFocus();
                repaint();
                return null;
            }
        }
        bmtd.creationDate = null;
        SimpleDateFormat dates = new SimpleDateFormat();
        dates.getDateTimeInstance();
        dates.applyPattern("M/d/y");
        if (expiration__dateField.getText().trim().equals(" "); ||
            expiration__dateField.getText().trim().equals("mm/dd/yy"))
            bmtd.batchExpirationDate = null;
        else {
            bmtd.batchExpirationDate = dates.parse(expiration__dateField.getText().trim(), new
ParsePosition(0));
            if (bmtd.batchExpirationDate == null) {
                JOptionPane.showMessageDialog(mainPane,"Invalid date format. Please re-
enter in\n mm/dd/yy format ie. 12/31/98.","Invalid Expiration Date.", JOptionPane.ERROR__MESSAGE);
                expiration__dateField.requestFocus();
                repaint();
                return null;
            }
        }
        if (!disableRadio.isSelected()) {
            if ((feeEnableRadio.isSelected()) &&(!feeTurnOffRadio.isSelected())) {
                if (todayRadio.isSelected()) {
                    bmtd.hit__date=new Date();
                }
                else {
                    dates = new SimpleDateFomat();
                    dates.getDateTimeInstance();
                    dates.applyPattern("M/d/y");
                    if (specifyDateField.getText().trim().equals(" "); ||
                        specifyDateField.getText().trim().equals("mm/dd/yy"))
                        bmtd.hit__date = null;
                    else {
                        bmtd.hit__date =
dates.parse(specifyDateField.getText().trim(), new ParsePosition(0));
                        if (bmtd.hit__date == null) {
                            JOptionPane.showMessageDialog(mainPane,"Invalid date
format. Please re-enter in\n mm/dd/yy format ie. 12/31/98.","Invalid Date.",JOptionPane.ERROR__MESSAGE);
                            specifyDateField.requestFocus();
                            repaint();
                            return null;
                        }
                    }
                }
            }
            try {
                if(feeDayIntervalRadio.isSelected()) {
                    bmtd.hit__period = new Short(feeDaysField.getText());
                    if (bmtd.hit__period.intValue() < 7) {
                        JOptionPane.showMessageDialog(mainPane,"The Fee
Fequency must be at least 7 days.","Invalid Fee Frequency.",JOptionPane.ERROR__MESSAGE);
                        feeDaysField.requestFocus();
```

-continued

```
                    repaint()
                    return null;
                }
                if (retroCheckBox.isSelected()) {
                    bmtd.hit_period = new Short((short)(-
bmtd.hit_period.intValue()));
                }
            }
            else if (feeMonthRadio.isSelected()) {
                if (retroCheckBox.isSelected()) {
                    bmtd.hit_period = new Short((short)-3);
                }
                else {
                    bmtd.hit_period = new Short((short)-1);
                }
            }
            else if (feeSemiRadio.isSelected()) {
                if (retroCheckBox.isSelected()) {
                    bmtd.hit_period = new Short((short) -4);
                }
                else {
                    bmtd.hit_period = new Short((short) -2);
                }
            }
        }
        catch (NumberFomatException nfe) {
            JOptionPane.showMessageDialog(mainPane,"Please enter a number for
fee frequency.","Invalid Fee Frequency.",JOptionPane.ERROR_MESSAGE);
            feeDaysField.requestFocus();
            repaint();
            return null;
        }
        if (feeAmtField.getText()!=null) {
            try {
                bmtd.hit_charge=new Integer(feeAmtField.getText());
            }
            catch(NumberForuatException nfe) {
                JOptionPane.showMessageDialog(mainPane,"Please enter a
number for fee amount.","Invalid Fee Amount.", JOptionPane.ERROR_MESSAGE);
                feeAmtField.requestFocus();
                repaint();
                return null;
            }
        }
        else {
            bmtd.hit_period=new Short((short) 0);
            bmtd.hit_charge=null;
            bmtd.hit_date=null;
        }
    }
    else {
        bmtd.hit_period=null;
        bmtd.hit_charge=null;
        bmtd.hit_date=null;
    }
    String text = max_recharge_amtField.getText();
    if (text.length() <= currencyLabel.length())
        bmtd.maxRechargeAmount = null;
    else {
        try {
            double value = parseCurrencyValue(text);
            bmtd.maxRechargeAmount = new Integer(new Double(value*100).intValue());
        }
        catch(NumberFomatException nfe) {
            JOptionPane.showMessageDialog(mainPane,"Unable to distinguish the Max
Recharge Amount.","Unknown Max Recharge Amount.",JOptionPane.ERROR_MESSAGE);
            max_recharge_amtField.requestFocus();
            repaint();
            return null;
        }
    }
    text = max_recharge_ttlField.getText();
    if (text.length() <= currencyLabel.length())
        bmtd.maxRechargeTotal = null;
    else {
        try {
            if (text.startsWith(currencyLabel)) {
                text = text.substring(currencyLabel.length(),text.length());
```

```
            }
            bmtd.maxRechargeTotal = new Integer(new Double(new
Double(text).doubleValue() * 100).intValue());
         }
         catch(NumberFormatException nfe) {
            JOptionPane.showMessageDialog(mainPane,"Unable to distinguish the Max
Recharge Total.","Unknown Max Recharge Total.",JOptionPane.ERROR_MESSAGE);
            max_recharge_ttlField.requestFocus();
            repaint();
            return null;
         }
      }
      if (max_renewalsField.getText().trim().equals(" "))
         bmtd.maxRenewals = null;
      else {
         try {
            bmtd.maxRenewals = new Short(max_renewalsField.getText().trim());
         }
         catch(NumberFormatException nfe) {
            JOptionPane.showInternalMessageDialog(mainPane,"Unable to distinguish the
Max Renewals.","Unknown Max Renewals.",JOptionPane.ERROR_MESSAGE);
            max_renewalsField.requestFocus();
            repaint();
            return null;
         }
      }
      String pad = (String)batchPadCombo.getSelectedItem();
      if (pad == null ||pad.equals("Default") || pad.equals(blankString)) {
         bmtd.batchPad = null;
      }
      else {
         bmtd.batchPad = new Integer(pad);
      }
      pad = (String)seqPadCombo.getSelectedItem();
      if (pad == null || pad.equals("Default") || pad.equals(blankString)) {
         bmtd.seqPad = null;
      }
      else {
         bmtd.seqPad = new Integer(pad);
      }
      bmtd.userWhoAdded = null;
      bmtd.whenAdded = null;
      bmtd.userWhoChanged = null;
      bmtd.whenChanged = null;
      if (batch_numberStartCombo.getSelectedIndex() == 0)
         bmtd.startBatchNumber = null;
      else {
         try {
            bmtd.startBatchNumber =
((BatchInfo)batch_numberStartCombo.getSelectedItem()).batchNumber;
         }
         catch(NumberFomatException nfe) {
            return null;
         }
      }
      if (batch_numberEndCombo.getSelectedIndex() == 0)
         bmtd.endBatchNumber = bmtd.startBatchNumber;
      else {
         try {
            bmtd.endBatchNumber =
((BatchInfo)batch_numberEndCombo.getSelectedItem()).batchNumber;
         }
         catch (NumberFormatException nfe) {
         }
      }
      if (fromField.getText().trim().equals(" "))
         bmtd.startseqNumber = null;
      else {
         try {
            bmtd.startSeqNumber = new Integer(fromField.getText());
         }
         catch (NumberFormatException nfe) {
            //if (DEBUG) System.out.println("Can't understand Start PIN Range.");
         }
      }
      if (bmtd.endBatchNumber != bmtd.startBatchNumber) {
         bmtd.endSeqNumber = null;
      }
      else if (toField.getText().trim().equals(" ")) {
```

-continued

```
            bmtd.endSeqNumber = null;
        }
        else }
          try {
            bmtd.endSeqNumber = new Integer(toField.getText().trim());
          }
          catch(NumberFormatException nfe) {
            JOptionPane.showInternalMessageDialog(mainPane,"Unable to distinguish the
End Sequence Number.","Unknown End Sequence.",JOptionPane.ERROR_MESSAGE);
            toField.requestFocus();
            repaint();
            return null;
          }
        }
        if (bmtd.startseqNumber == null) {
          bmtd.endSeqNumber = null;
        }
        if (bmtd.endSeqNumber == null) {
          bmtd.startSeqNumber = null;
        }
        text = original_balanceField.getText();
        if (text.length() <= currencyLabel.length())
          bmtd.originalBalance = null;
        else {
          try {
            if (text.startsWith(currencyLabel)) {
              text = text.substring(currencyLabel.length() text.length());
            }
            bmtd.originalBalance = dollarsToCents(text);
          }
          catch(NumberFomatException nfe) {
            JOptionPane.showInternalMessageDialog(mainPane,"Unable to distinguish the
Original Balance.","Unknown Original Balance.",JOptionPane.ERROR_MESSAGE);
            original_balanceField.requestFocus();
            repaint();
            return null;
          }
        }
        text = amount_remainingField.getText();
        if (text.length() <= currencyLabel length())
          bmtd.amountRemaining = null;
        else {
          try {
            if (text.startsWith(currencyLabel)) {
              text = text.substring(currencyLabel.length(),text.length());
            }
            bmtd.amountRemaining = dollarsToCents(text);
          }
          catch(NumberFomatException nfe) {
            JOptionPane.showInternalMessageDialog(mainPane,"Unable to distinguish the
Amount Remaining.","Unknown Amount Remaining.", JOptionPane.ERROR_MESSAGE);
            amount_remainingField.requestFocus();
            repaint();
            return null;
          }
        }
        text = amount_usedField.getText();
        if (text.length() <= currencyLabel.length())
          bmtd.amountUsed = null;
          else {
            try {
              if (text.startsWith(currencyLabel)) {
                text = text.substring(currencyLabel.length(),text.length());
              }
              bmtd.amountUsed = dollarsToCents(text);
            }
            catch (NumberFomatException nfe) {
              JOptionPane.showMessageDialog(mainPane,"Unable to distinguish the Amount
Used.","Unknown Amount Used.",JOptionPane.ERROR_MESSAGE);
              amount_usedField.requestFocus();
              repaint();
              return null;
            }
          }
          if (bmtd.originalBalance != null) {
            if (bmtd.amountUsed != null) {
              if (bmtd.amountRemaining != null) {
                if (bmtd.originalBalance.intValue() - bmtd.amountUsed.intValue() !=
bmtd.amountRemaining.intValue()) {
```

```
                    JOptionPane.showMessageDialog(mainPane,"Amount Remaining
should equal Original Balance minus Amount Used.","Math Error", JOptionPane.ERROR_MESSAGE);
                        return null;
                    }
                }
            }
        }
        if (init_exp_daysField.getText() trim().equals(" "))
            bmtd.initExpDays = null;
        else {
            try {
                bmtd.initExpDays = new Short(init_exp_daysField.getText().trim());
            }
            catch (NumberFormatException nfe) {
                JOptionPane.showMessageDialog(mainpane,"Unable to distinguish the Days to
Expire after Initially used.","Unknown Days to Expire after Initialiazation.",JOptionPane.ERROR_MESSAGE);
                init_exp_daysField.requestFocus();
                repaint();
                return null;
            }
        }
        SimpleDateFormat formatter = new SimpleDateFomat();
        fomatter.getDateTimeInstance();
        formatter.applyPattern("yyyy-MM-dd");
        if (last_exp_daysField.getText().trim().equals(" "))
            bmtd.lastExpDays = null;
        else {
            try {
                bmtd.lastExpDays = new Short(last_exp_daysField.getText().trim());
            }
            catch (NumberFormatException nfe) {
                JOptionPane.showMessageDialog(mainPane,"Unable to distinguish the Days to
Expire after last used.","Unknown Days to Expire after last used.",JOptionPane.ERROR_MESSAGE);
                last_exp_daysField.requestFocus();
                repaint();
                return null;
            }
        }
        if (last_exp_daysField.getText().trim().equals(" "))
            bmtd.lastExpDays = null;
        else {
            try {
                bmtd.lastExpDays = new Short(last_exp_daysField.getText().trim());
            }
            catch (NumberFormatException nfe) {
                JOptionPane.showMessageDialog(mainPane,"Unable to distinguish the Days to
Expire after last used.","Unknown Days to Expire after last used.",JOptionPane.ERROR_MESSAGE);
                last_exp_daysField.requestFocus();
                repaint();
                return null;
            }
        }
        if (retail_planCombo.getSelectedIndex() == 0)
            bmtd.retailPlan = null;
        else
            bmtd.retailPlan = ((RatePlanInfo) retail_planCombo.getSelectedItem()).ratePlan;
        if (dnis_setCombo.getSelectedIndex() == 0)
            bmtd.dnisSet = null;
        else
            bmtd.dnisSet = ((DnisSetInfo)dnis_setCombo.getSelectedItem()).dnisSet;
        if (pin_statusCombo.getSelectedIndex() == 0)
            bmtd.pinStatus = null;
        else
            bmtd.pinStatus = ((pinStatusInfo)pin_statusCombo.getSelectedItem()).pinStatus;
        if (activation_dateField.getText().trim().equals(" ") ||
            activation_dateField.getText().trim().equals("mm/dd/yy"))
            bmtd.activationDate = null;
        else {
            bmtd.activationDate = dates.parse(activation_dateField.getText().trim(), new
ParsePosition(0));
            if (bmtd.activationDate == null) {
                JOptionPane.showMessageDialog(mainPane,"Unable to distinguish Activation
Date. Please use \na mm/dd/yy format ie. 12/31/98.","Unknown Date.",JOptionPane.ERROR_MESSAGE);
                activation_dateField.requestFocus();
                repaint();
                return null;
            }
        }
        bmtd.pinExpirationDate = bmtd.batchExpirationDate;
```

-continued

```
            if (post_in_brandingField.getText().trim().equals(" ")) {
                bmtd.post_pin_branding = null;
            }// if
            else {
                bmtd.post_pin_branding = post_pin_brandingField.getText().trim();
            }// else
            return bmtd;
    }
    Integer dollarsToCents(Strimg text) {
        int delimiter = text.indexOf(".");
        String dollars = null;
        String cent = null;
        if (delimiter > 0) {
            dollars = text.substrimg(0,delimiter);
        }//if
        if (delimiter > -1) {
            cents = text.substrimg(delimiter+1,delimiter+3);
        }//if
        else {
            dollars = text;
        }//else
        Integer d = new Integer(0);
        Integer c = new Integer(0);
        if (dollars != null) {
            d = new Integer(new Integer(dollars).intValue() * 100);
        }//if
        if (cents != null) {
            c = new Integer(cents);
        }//if
        Integer ret = new Integer(d.intValue() +c.intValue());
        return ret;
    }
    class CancelAction implements ActionListener {
        public void actionPerformed(ActionEvent ae) {
            descriptionField.setEditable(false);
            pins_in_batchField.setEditable(false);
            descriptionField.repaint();
            pins_in_batchField.repaint();
            state = BatchMast.MODIFY;
            batch_numberStartCombo.setSelectedIndex(0);
            enableComponents(true);
            statusBar.setStatus(" ");
            customerPane.repaint();
        }
    }
//*************************************************************************************
*********************
//*************************************************************************************
*********************
    class RadioActionAdapter implements ActionListener {
        public void actionPerformed(ActionEvent ae) {
            String action = ae.getActionCommand();
            if (action.equals("all")) {
                fromField.setText(" ");
                toField.setText(" ");
                fromField.setEditable(false);
                toField.setEditable(false);
                fromField.repaint();
                toField.repaint();
            }
            else if (action.equals("fron")) {
                fromField.setEditable(true);
                toField.setEditable(true);
                fromField.repaint();
                toField.repaint();
            }
        }
    }
    public void addListenerToComponents() {
        STFocusAdapter stf = new STFocusAdapter();
        STCurrencyFomatter stc = new STCurrencyFomatter();
        customer_numberCombo.addFocusListener(stf);
        sub_cust_numberCombo.addFocusListener(stf);
        batch_numberStartCombo.addFocusListener(stf);
        batch_numberEndCombo.addFocusListener(stf);
        descriptionField.addFocusListener(stf);
        pins_in_batchField.addFocusListener(stf);
        max_recharge_amtField.addFocusListener(stc);
        creation_dateField.addFocusListener(stf);
```

```
        max_recharge_ttlField.addFocusListener(stc);
        expiration_dateField.addFocusListener(stf);
        max_renewalsField.addFocusListener(stf);
        allRadio.addFocusListener(stf);
        fromRadio.addFocusListener(stf);
        fromField.addFocusListener(stf);
        toField.addFocusListener(stf);
        user_who_addedField.addFocusListener(stf);
        when_addedField.addFocusListener(stf);
        user_who_changedField.addFocusListener(stf);
        when_changedField.addFocusListener(stf);
        original_balanceField.addFocusListener(stc);
        retail_planCombo.addFocusListener(stf);
        amount_usedField.addFocusListener(stc);
        amount_remainingField.addFocusListener(stc);
        dnis_setCombo.addFocusListener(stf);
        activation_dateField.addFocusListener(stf);
        pin_statusCombo.addFocusListener(stf);
        userpin_statusCombo.addFocusListener(stf);
        init_exp_daysField.addFocusListener(stf);
        last_exp_daysField.addFocusListener(stf);
        btnNew.addFocusListener(stf);
        btnSave.addFocusListener(stf);
        btnCancel.addFocusListener(stf);
        feeDaysField.addFocusListener(stf);
        feeAmtField.addFocusListener(stf);
        specifyDateField.addpocusListener(stf);
    }
    public void setupPermissions() {
        try {
            PermissionsInterface pint =
clientInterface.servletInterface.getPermissions(username);
            canMod = pint.canModify();
            canAdd = pint.canAdd();
            canView = pint.canView();
            canAdnin = pint.canAdmin();
        }
        catch (ServletException se) {
            //if (DEBUG) System.out.println("Servlet exception while getting permissions");
            //if (DEBUG) System.out.println(se.getMessage());
        }
        catch (RemoteException re) {
            //if (DEBUG) System.out.println("Remote exception while getting permissions");
            //if (DEBUG) System.out.println(re.getMessage());
            re.printStackTrace();
        }
    }
    public void enableComponents(boolean state) {
        sub_cust_numberCombo.setEnabled(state);
        if (this.state == BatchMast.NEW) {
            customer_numberCombo.setEnabled(false);
            batch_numberEndCombo.setEnabled(false);
            customer_numberCombo.setEnabled(false);
            fromRadio.setEnabled(false);
            fromField.setEnabled(false);
            toField.setEnabled(false);
            descriptionField.setEnabled(state);
            pins_in_batchField.setEnabled(state);
        }
        else {
            customer_numberCombo_setEnabled(state);
            batch_numberStartCombo.setEnabled(state);
            batch_numberEndCombo.setEnabled(state);
            descriptionField.setEnabled(false);
            pins_in_batchField.setEnabled(false);
            fromRadio.setEnabled(state);
            fromField.setEnabled(state);
            toField.setEnabled(state);
        }
        max_recharge_amtField.setEnabled(state);
        creation_dateField.setEnabled(false);
        max_recharge_ttlField.setEnabled(state);
        expiration_dateField.setEnabled(state);
        max_renewalsField.setEnabled(state);
        allRadio.setEnabled(state);
        user_who_addedField.setEnabled(false);
        when_addedField.setEnabled(false);
        user_who_changedField.setEnabled(false);
        when_changedField.setEnabled(false);
```

-continued

```
      original_balanceField.setEnabled(state);
      retail_planCombo.setEnabled(state);
      amount_usedField.setEnabled(state);
      amount_remainingField.setEnabled(state);
      dnis_setCombo.setEnabled(state);
      activation_dateField.setEnabled(state);
      pin_statusCombo.setEnabled(state);
      userpin_statusCombo.setEnabled(state);
      init_exp_daysField.setEnabled(state);
      last_exp_daysField.setEnabled(state);
      if (customer_numberCombo.getSelectedIndex() > 0) {
        btnNew.setEnabled(state ? canAdd : state);
        btnSave.setEnabled(state ? canMod : state);
        btnCancel.setEnabled(state);
      }
      else {
        btnNew.setEnabled(false);
        btnSave.setEnabled(false);
        btnCancel.setEnabled(false);
      }
      if (this.state == BatchMast.NEW) {
        btnNew.setEnabled(false);
      }
      if (!disableRadio.isSelected()) {
        //feeEnableRadio.setEnabled(state);
        todayRadio.setEnabled(state);
        specifyDateRadio.setEnabled(state);
        feeMonthRadio.setEnabled(state);
        feeSemiRadio.setEnabled(state);
        feeTurnOffRadio.setEnabled(state);
        feeDayIntervalRadio.setEnabled(state);
        retroCheckBox.setEnabled(state);
        feeAmtField.setEnabled(state);
        daysLabel.setEnabled(state);
        everyLabel.setEnabled(state);
      }
    }
    public void setUI() {
      try {
        UIManager.setLookAndFeel("com.sun.java.swing.plaf.motif.MotifLookAndFeel");
        SwingUtilities.updateComponentTreeUI(this);
      }
      catch (UnsupportedLookAndFeelException ulafe) {
      }
      catch(Exception e) {
      }
    }
    public void setBatchListVariable() {
      Object [] options = {"OK", "Cancel"};
      String val = " "+MAX_BATCHES_TO_SHOW;
      String response = (String)JOptionPane.showInputDialog(mainPane, "Enter the number of batch numbers to load",
          "Batch Number Load Configuration",
JOptionPane.OK_CANCEL_OPTION, null,
          options, val);
      if (response == null)
        return;
      try {
        int nAmount= (new Integer((String)response).intValue());
        if (nAmount < 1)
          nAmount = 1;
        if (nAmount > 1000)
          nAmount = 1000;
        MAX_BATCHES_TO_SHOW = nAmount;
      }
      catch (NumberFormatException e) {
      }
  }
}
public Strimg formatCurrencyValue(double value) {
    NumberFormat format = NumberFormat.getCurrencyInstance();
    return format.format(value);
}
public double parseCurrencyValue(String value) {
    NumberFormat format = NumberFormat.getCurrencyInstance();
    try {
      return format.parse(value).doubleValue();
    }
    catch (ParseException pe) {
      return -99;
```

```
    }
}
public void setVersionNumber(double num) {
    versionNumber = num;
}
public double getVersionNumber() {
    return versionNumber;
}
```

The computer listing provided above is merely exemplary of the features and attributes of the present invention as discussed above. Other embodiments and structures may be used to achieve the functionality now provided by the present invention.

Thus, having fully described the present invention by way of example with reference to the attached drawing figures, it will be readily appreciated that many changes and modifications may be made to the invention and to any of the exemplary embodiments shown and or described herein without departing from the spirit or scope of the invention which is defined in the appended claims.

What is claimed is:

1. A system for provisioning on-demand communications services and for consolidating billing data related to said services for a subscriber, comprising:

a network management facility communicating with and controlling disparate telecommunications devices within a telecommunications network, wherein said network management facility automatically configures and controls said disparate telecommunications devices within said network in real-time;

a database facility storing inventory data related to said disparate telecommunications devices within said network, said database facility also storing billing data generated by each of said disparate telecommunications devices; and an interface accessible via a network connection, coupled to said database facility and configured to access said network management facility via said network and to provision at least one of said disparate telecommunications devices to provide at least one communication service on-demand and in real-time based upon corresponding inventory data stored by said database facility, and to access said database facility to consolidate said billing data to generate a consolidated billing message.

2. The system according to claim 1, wherein said database maintains address, communication protocol, manufacturer and vendor information corresponding to said disparate telecommunications devices within said network.

3. The system according to claim 1, wherein said communication service includes bandwidth allocation to an Internet customer.

4. The system according to claim 1, wherein said interface is further configured to access said network management facility and to provision said network in order to monitor and route traffic though said network.

5. The system according to claim 1, wherein said interface is further configured to access said network management facility and to provision said network in real-time.

6. The system according to claim 1, wherein said network management facility communicates with said disparate telecommunications devices using a standard communications protocol.

7. The system according to claim 4, wherein said standard communications protocol is the H.323 protocol.

8. The system according to claim 1, wherein said disparate telecommunications devices include switches, routers, gatekeepers, servers, and interactive voice response units (IVRU).

9. The system according to claim 1, wherein said consolidated billing message is made available to a customer via the Internet.

10. The system according to claim 1, wherein said consolidated billing message includes billing data generated by a plurality of telecommunications devices based on said at least one communications service.

11. The system according to claim 1, wherein said consolidated billing notice includes references to billing data provided by at least one telecommunications provider corresponding to said at least one telecommunications device.

12. The system according to claim 1, wherein said consolidated billing notice is accessible via said telecommunications network in real time.

13. The system according to claim 1, wherein said consolidated billing notice is accessible via the Internet in real time and during the provisioning of said at least one communications service.

* * * * *